United States Patent
Cohen et al.

(10) Patent No.: US 9,692,887 B2
(45) Date of Patent: Jun. 27, 2017

(54) COMPONENT INFORMATION AND AUXILIARY INFORMATION RELATED TO INFORMATION MANAGEMENT

(71) Applicant: SEARETE LLC, Bellevue, WA (US)

(72) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); William Henry Mangione-Smith, Kirkland, WA (US); John D. Rinaldo, Jr., Bellevue, WA (US); Clarence T. Tegreene, Mercer Island, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 0 days.

(21) Appl. No.: 14/881,883

(22) Filed: Oct. 13, 2015

(65) Prior Publication Data
US 2016/0234380 A1    Aug. 11, 2016

Related U.S. Application Data

(63) Continuation of application No. 14/095,743, filed on Dec. 3, 2013, now Pat. No. 9,158,771, which is a continuation of application No. 11/702,012, filed on Feb. 1, 2007, now Pat. No. 8,626,731.

(51) Int. Cl.
G06F 17/30 (2006.01)
H04M 3/42 (2006.01)
G10L 17/00 (2013.01)
G06F 17/27 (2006.01)
G10L 17/04 (2013.01)

(52) U.S. Cl.
CPC ...... *H04M 3/42042* (2013.01); *G06F 17/279* (2013.01); *G06F 17/30023* (2013.01); *G06F 17/30684* (2013.01); *G10L 17/00* (2013.01); *G10L 17/04* (2013.01); *H04M 2242/30* (2013.01); *Y10S 707/913* (2013.01)

(58) Field of Classification Search
CPC ......... G06F 17/30654; G06F 17/30696; G06F 17/30684
USPC .................................... 707/723, 805
See application file for complete search history.

(56) References Cited

U.S. PATENT DOCUMENTS 5,963,940 A * 10/1999 Liddy .............. G06F 17/30654
                                                707/723
6,026,409 A *  2/2000 Blumenthal ...... G06F 17/30696
                                                707/805

* cited by examiner

*Primary Examiner* — Shahid Alam

(57) ABSTRACT

In one aspect, a method related to receiving, retrieving and presenting information. In addition, other method, system, and program product aspects are described in the claims, drawings, and/or text forming a part of the present disclosure.

30 Claims, 9 Drawing Sheets

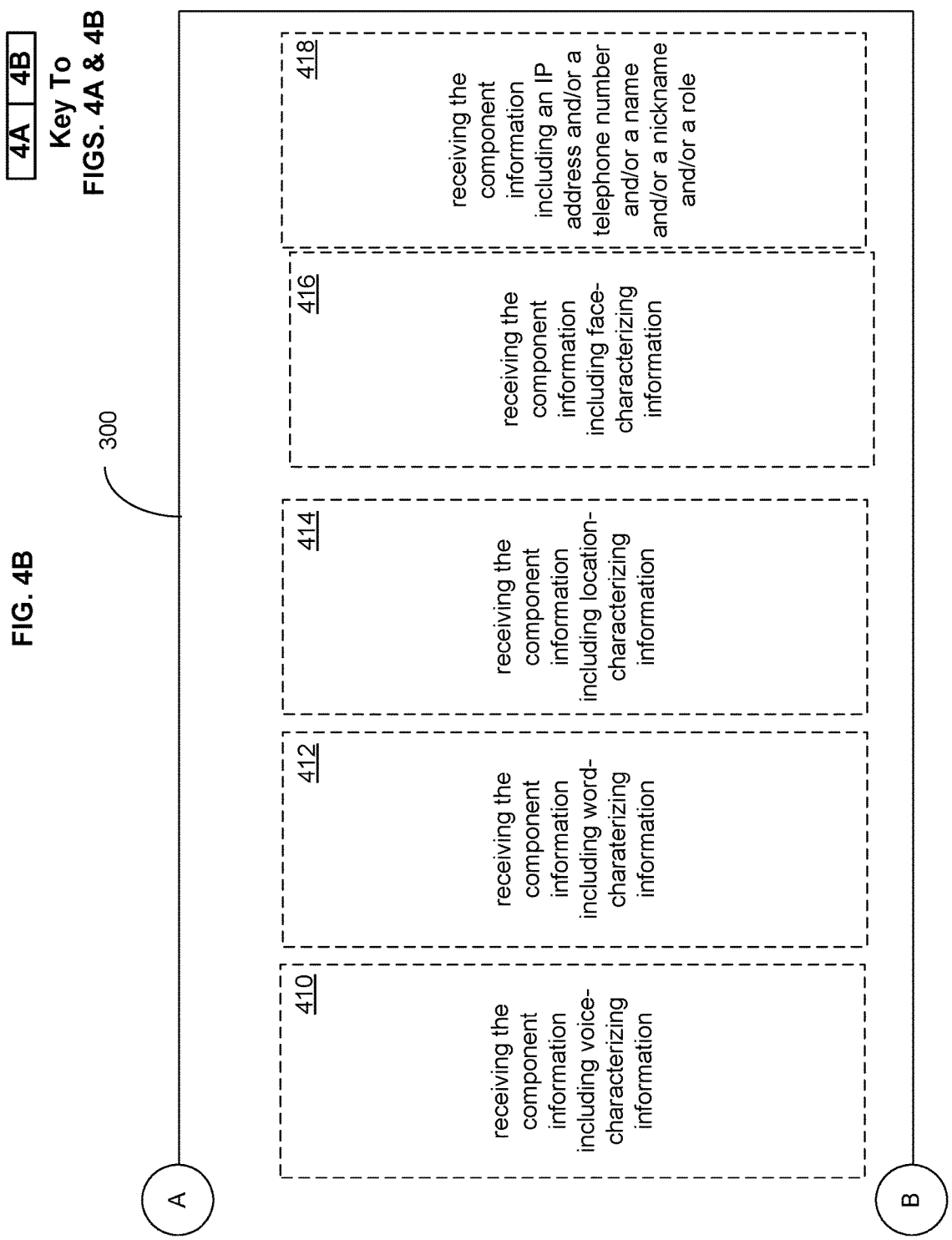

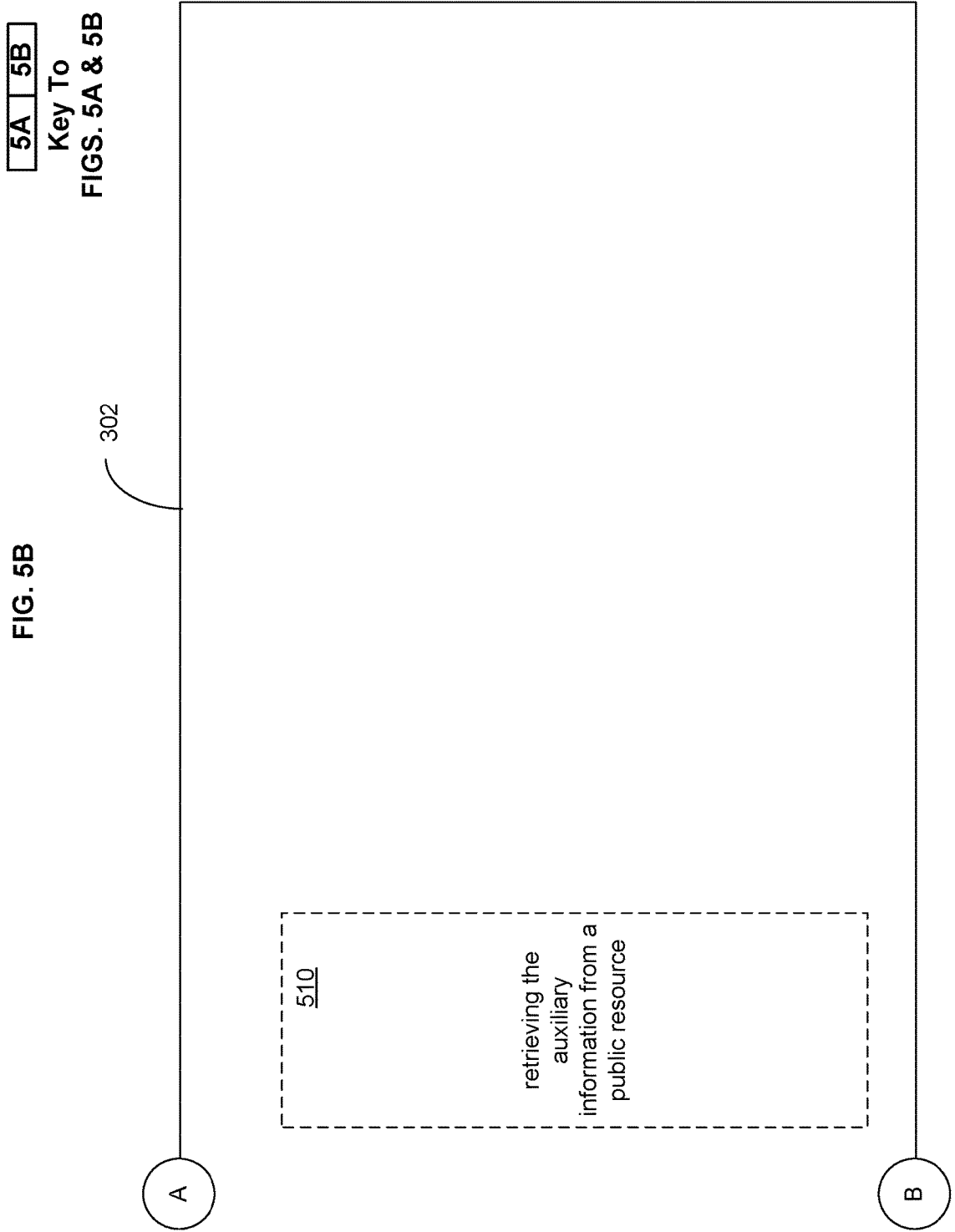

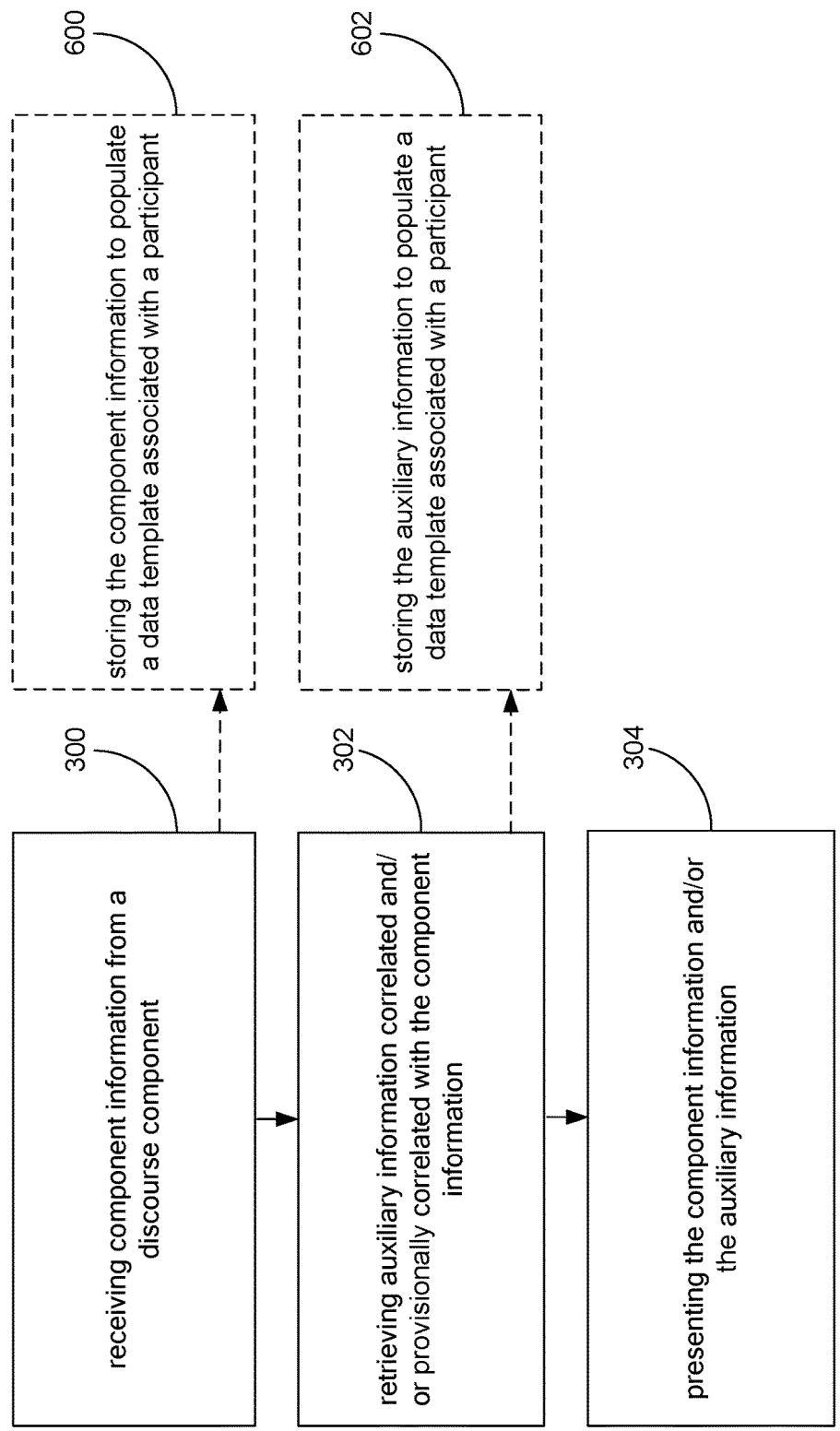

COMPONENT INFORMATION AND AUXILIARY INFORMATION RELATED TO INFORMATION MANAGEMENT

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of currently pending U.S. patent application Ser. No. 14/095,743, entitled Component Information and Auxiliary Information Related to Information Management, naming Alexander J. Cohen, Edward K. Y. Jung, Royce A. Levien, Robert W. Lord, Mark A. Malamud, William Henry Mangione-Smith, John D. Rinaldo, Jr., and Clarence T. Tegreene, as inventors, filed 3 Dec. 2013, which application is either currently co-pending, or is an application of which a currently co-pending application is entitled to the benefit of the filing date.

For purposes of the USPTO extra-statutory requirements, the present application constitutes a continuation of currently pending U.S. patent application Ser. No. 11/702,012, entitled Component Information and Auxiliary Information Related to Information Management, naming Alexander J. Cohen, Edward K. Y. Jung, Royce A. Levien, Robert W. Lord, Mark A. Malamud, William Henry Mangione-Smith, John D. Rinaldo, Jr., and Clarence T. Tegreene, as inventors, filed 1 Feb. 2007, now issued as U.S. Pat. No. 8,626,731 on 1 Jan. 2014, which is an application of which a currently co-pending application is entitled to the benefit of the filing date.

RELATED APPLICATIONS

None.

The United States Patent Office (USPTO) has published a notice to the effect that the USPTO's computer programs require that patent applicants both reference a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

The present disclosure relates, in general, to communications.

SUMMARY

In one aspect, a method related to information management includes but is not limited to receiving component information from a discourse component; retrieving auxiliary information correlated and/or provisionally correlated with the component information and presenting the component information and/or the auxiliary information. In addition to the foregoing, other method aspects are described in the claims, drawings, and text forming a part of the present disclosure.

In one aspect, a system related to information management includes but is not limited to circuitry for receiving component information from a discourse component; circuitry for retrieving auxiliary information correlated and/or provisionally correlated with the component information; circuitry for presenting the component information and/or the auxiliary information. In addition to the foregoing, other system aspects are described in the claims, drawings, and text forming a part of the present disclosure.

In one or more various aspects, related systems include but are not limited to circuitry and/or programming and/or electro-mechanical devices and/or optical devices for effecting the herein-referenced method aspects; the circuitry and/or programming and/or electro-mechanical devices and/or optical devices can be virtually any combination of hardware, software, and/or firmware configured to effect the herein-referenced method aspects depending upon the design choices of the system designer skilled in the art.

In one aspect, a program product related to information management includes but is not limited to a signal bearing medium bearing one or more instructions for receiving component information from a discourse component; one or more instructions for retrieving auxiliary information correlated and/or provisionally correlated with the component information; and one or more instructions for presenting the component information and/or the auxiliary information. In addition to the foregoing, other program product aspects are described in the claims, drawings, and text forming a part of the present disclosure.

In addition to the foregoing, various other method, system, and/or program product aspects are set forth and described in the teachings such as the text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIGS. 4A and 4B illustrate a high-level logic flowchart of an operational process;

FIGS. 5A and 5B show a high-level logic flowchart of an operational process;

FIG. 6 illustrates a high-level logic flowchart of an operational process; and

The use of the same symbols in different drawings typically indicates similar or identical items.

DETAILED DESCRIPTION

Figure 1:
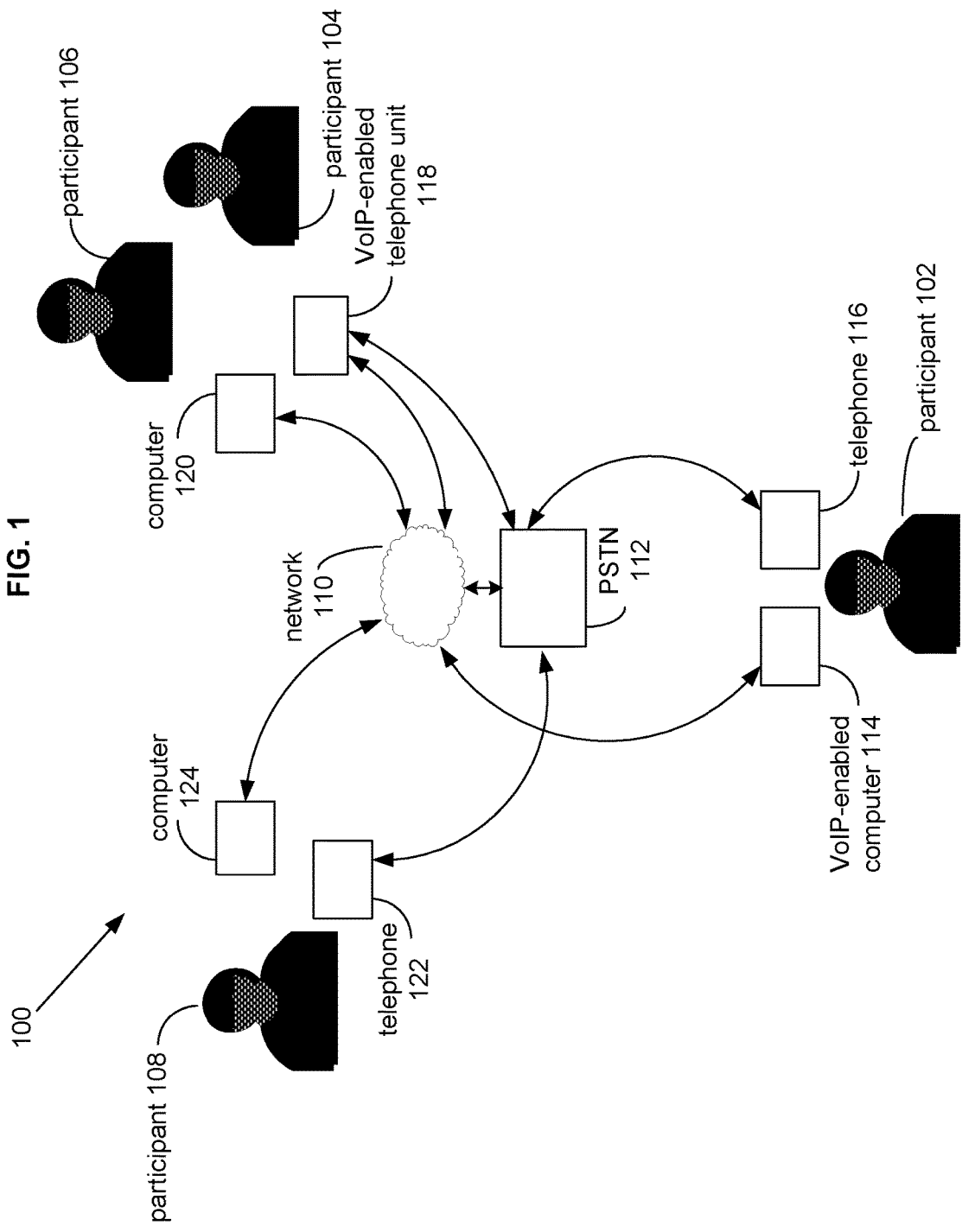
FIG. 1 shows an exemplary environment in which the methods and systems described herein may be represented.

FIG. 1 depicts an exemplary environment in which the methods and systems herein may be represented. The exemplary environment 100 shows four representative participants, participant 102, participant 104, participant 106, and participant 108, participating in a discourse taking place over a Voice-over-Internet-Protocol (herein, "VoIP") equipment and components of the internet, represented by the network 110 and/or over a public switched telephone network (herein, "PSTN"), represented by the PSTN 112. Participants in a discourse may include persons and/or software agents acting, e.g., on behalf of a person or persons and/or autonomously. As used herein, a "discourse" may include but not be limited to two-or-more-way communication among two or more participants (such as participants 102, 104, 106, and/or 108) (e.g., a give-and-take of questions and answers among the various participants) and/or one-way communication from one or more participants at one location and/or using one set of communications equipment (such as participants 104 and/or 106) to one or more participants participating in a discourse (e.g., a presentation by one or more participants 104 and/or 106 to the other participants 102 and/or 108). The participants 102, 104, 106 and/or 108 are representative of any number of participants in discourses possible in the exemplary environment 100.

In the exemplary environment 100, the participant 102 may use a VoIP-enabled computer 114 that is operably coupled to the network 110 and/or a telephone 116 operably coupled to the PSTN 112 to participate in the conversation. The VoIP-enabled computer 114 and/or a similar computer may be configured to send and receive electronic mail (herein, "email"), instant messages and/or text messages and may be configured to present visual and/or sonic and/or tactile information, e.g., pictures, graphics, voices, sounds, and/or vibrations (such as vibrating an object to signal an incoming communication).

In the exemplary environment 100, the participants 104 and/or 106 may use a VoIP-enabled telephone unit 118 operably coupled to the network 110 and/or the PSTN 112 and/or a computer 120 which may be operably coupled to the network 110 and configured to send and receive email, instant messages and/or text messages and which may be configured to present visual and/or sonic and/or tactile information, e.g., pictures, graphics, voices, sounds, and/or vibrations (such as vibrating an object to signal an incoming communication).

In the exemplary environment 100, the participant 108 may use a telephone 122 operably connected to the PSTN 112 and the computer 124 which may be operably coupled to the network 110, which may be configured to send and receive email, instant messages and/or text messages and which may be configured to present visual and/or sonic and/or tactile information, e.g., pictures, graphics, voices, sounds, and/or vibrations (such as vibrating an object to signal an incoming communication).

Specific items of hardware and/or software and/or firmware (herein, "hardware/software/firmware") may be incorporated in and/or associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124.

In the exemplary environment 100, the participants may participate together in a discourse in which any of the participants 102, 104, 106, and/or 108 may use each of the items of equipment associated with them herein to communicate in a discourse (also referred to as a "communications discourse"). The discourse may include but not be limited to a discourse component. Such a discourse component may include but not be limited to an audio component (e.g., live and/or recorded voice) and/or a video component (e.g., live and/or recorded video) and/or a graphic component (e.g., slides and/or pictures) and/or a text component (e.g., a text file and/or an email) to communicate with any or all of the other participants 102, 104, 106, and/or 108. Any given item communicated may be communicated to any, some, or all of the participants 102, 104, 106, and/or 108 in the discourse.

A discourse component may include but not be limited to component information. Such component information may include but not be limited to spoken and/or text and/or graphic and/or imaged words and/or visual items such as images and graphic items. Such component information may include but not be limited to voice characterization information and/or a name, an identifier, a location, a word and/or a phrase specifying a topic, an image of a face, and/or data incorporating an IP address and/or a telephone number and/or a name and/or an identifier, and/or sound frequency information, and/or a voiceprint, and/or a facial recognition feature.

Another type of information, auxiliary information may include but not be limited to information correlated and/or provisionally correlated with component information may be stored in and retrieved from storage resources that are associated with one or more of the participants 102, 104, 106, and/or 108 (e.g., an in-house database), and/or in storage resources associated with one or more third parties (e.g., a commercial database accessible by fee), and/or in public storage resources (e.g., a database or stored document accessible by the public without limitation, such as a weblog). Such auxiliary information may include but not be limited to a name, a location, an identifier, a topic, a document, a graphic, an image, and/or an IP address and/or a telephone number and/or a name and/or an identifier.

Information including but not limited to component information and/or auxiliary information may be presented using presentation features of the VoIP-enabled computer 114 and/or the telephone 116 and/or the VoIP-enabled telephone unit 118 and/or the computer 120 and/or the telephone 122 and/or the computer 124, including but not limited to a visual presentation feature (e.g., a computer screen) and/or a audio presentation feature (e.g., a speaker) and/or a tactile presentation feature (e.g., a device shaker).

Information included but not limited to component information and/or auxiliary information may be stored to populate a data template, e.g., a graphic field on computer screen such as the VoIP-enabled computer 114, where the graphic field is associated with the participant 108, such that the graphic field is used to present information about participant 108 to participant 102.

Figure 2:
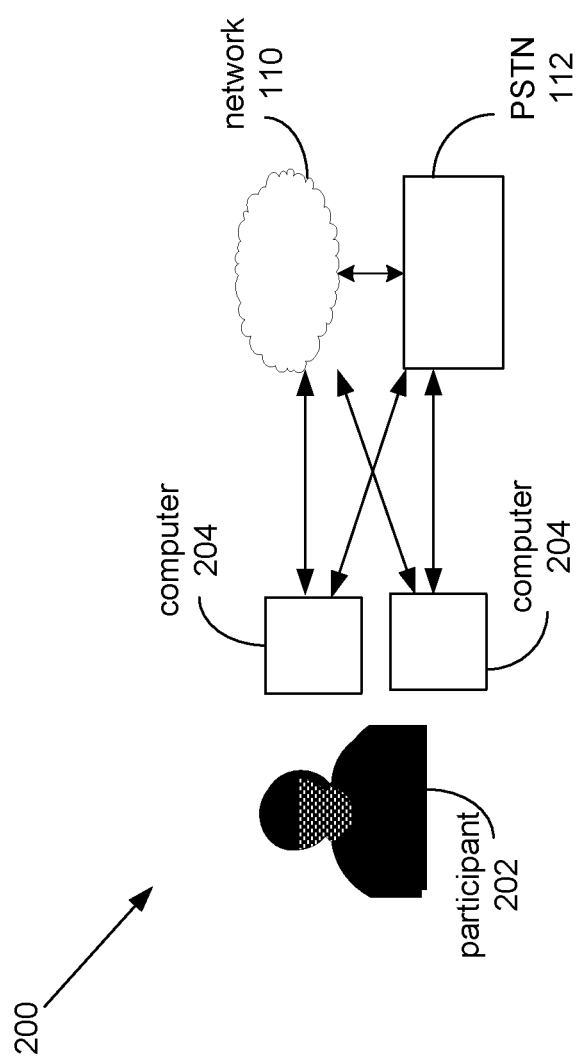
FIG. 2 illustrates an exemplary environment in which the methods and systems described herein may be represented.

FIG. 2 illustrates an exemplary environment in which the methods and systems described herein may be represented. In the exemplary environment 200, the single person or a single group of two or more people (both the single person and the single group being represented by the participant 202) may use one or more computers 204 to receive component information and/or to retrieve auxiliary information having to do with a discourse comprising a monologue of the single person represented by the participant 202 or from a discourse comprising a dialogue among the group of people represented by the participant 202, and/or to present the component information and/or auxiliary information. The one or more computers 204 may be operably coupled to the network 110 and/or the PSTN 112.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 3:
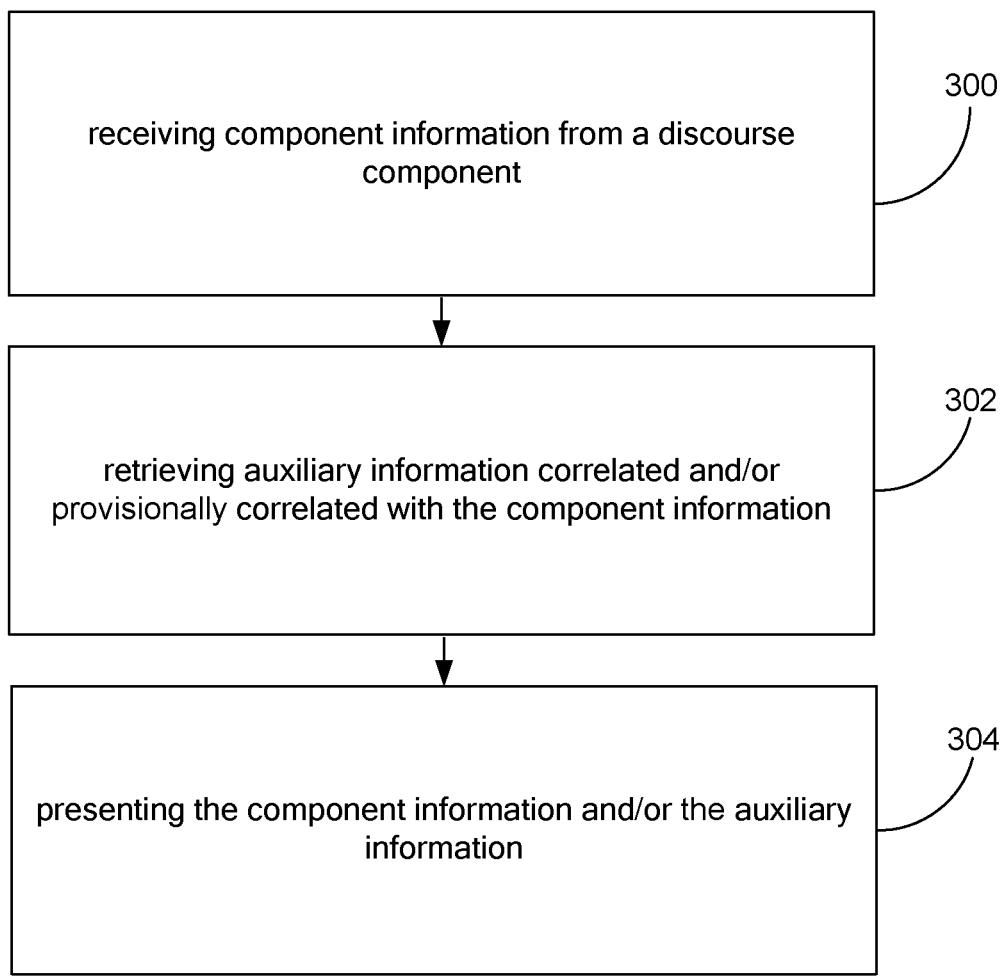
FIG. 3 depicts a high-level logic flowchart of an operational process.

FIG. 3 depicts a high-level logic flowchart of an operational process. The illustrated process may include operation 300, operation 302, and/or operation 304.

Operation 300 shows receiving component information from a discourse component. Operation 300 may include, for example, receiving component information from a discourse component, where a discourse component including an audio component may include, e.g., a voice of a participant 102 and/or 104 and/or 106 and/or 108 and/or 202 in the discourse and/or stored (e.g., recorded and/or stored in a computer memory) voice data that is used in the discourse. Further, a discourse component including a video component may include, e.g., a video signal including an image of the face of a participant 102 and/or 104 and/or 106 and/or 108 and/or 202 in the discourse and/or stored (e.g., recorded and/or stored in a computer memory) video data. In addition, a discourse component including a graphic component may include, e.g., a drawing and/or a photograph and/or a video still image and/or another pictorial representation. Further, a discourse component including a text component may include, e.g., an electronic text document (e.g., a MICROSOFT® WORD document and/or a portable document format (herein, "PDF") and/or an email and/or a facsimile document. In the context of the exemplary environment 100, operation 300 may include, for instance, receiving component information from a discourse component, where, in a discourse in which participants 102 and/or 104 and/or 106 and/or 108 are participating, the VoIP-enabled computer 114 associated with the participant 102 receives discourse components including an audio component and a text component. In one specific example of operation 300, during a conference call participant 104 directs computer 120 to transmit to participant 102, through VoIP-enabled computer 114, discourse components including an audio component, such as a signal carrying the speech of participant 104, and a text component, such as an email including text. The VoIP-enabled computer 114 receives the discourse components and receives the component information from the discourse components, including, e.g., voice-characterizing information (e.g., sonic frequency spectrum information) from the audio component and the name "David Bowman" from the text component. Upon receipt, participant 102 indicates to VoIP-enabled computer 114 through some means (e.g., a voice and/or graphical user interface) that participant 102 is interested in any additional information that VoIP-enabled computer 114 could supply regarding participant 104 using the component information, that is, the sonic frequency spectrum information and the name "David Bowman."

The receiving of operation 300 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Operation 302 depicts retrieving auxiliary information correlated and/or provisionally correlated with the component information. Operation 302 may include, for instance, retrieving auxiliary information correlated and/or provisionally correlated with the component information, where the auxiliary information may include, e.g., a name such as an actual name and/or a nickname and/or an assigned name or an individual or an entity, for instance that of the participant 102 and/or 104 and/or 106 and/or 108 and/or 202 or a person and/or an entity with which a participant 102 and/or 104 and/or 106 and/or 108 and/or 202 may be associated. The auxiliary information may also include a location with which a participant 102 and/or 104 and/or 106 and/or 108 and/or 202 and/or a person and/or entity with which a participant 102 and/or 104 and/or 106 and/or 108 and/or 202 may be associated, such as a street address and/or the name of a location (e.g., a building name and/or a business name) and/or geographical coordinates such as latitude and longitude and/or an identifier such as a code name and/or an alphanumeric tag representing a location. The auxiliary information may also include a topic with which a participant 102 and/or 104 and/or 106 and/or 108 and/or 202 is associated, and/or a topic with which a person and/or an entity with which a participant 102 and/or 104 and/or 106 and/or 108 and/or 202 is associated, such as a client matter and/or a medical file and/or a business matter. The auxiliary information may also include a document with which a participant 102 and/or 104 and/or 106 and/or 108 and/or 202 is associated, and/or a document with which a person and/or an entity with which a participant 102 and/or 104 and/or 106 and/or 108 and/or 202 is associated, such as a medical report and/or a client file and/or financial statement. The auxiliary information may also include a graphic with which a participant 102 and/or 104 and/or 106 and/or 108 and/or 202 is associated, and/or a graphic with which a person and/or an entity with which a participant 102 and/or 104 and/or 106 and/or 108 and/or 202 is associated, such as an organizational chart and/or an event timeline and/or a social network diagram. The auxiliary information may also include an image with which a participant 102 and/or 104 and/or 106 and/or 108 and/or 202 is associated, and/or an image with which a person and/or an entity with which a participant 102 and/or 104 and/or 106 and/or 108 and/or 202 is associated, such as a photograph of a participant 102 and/or 104 and/or 106 and/or 108 and/or 202 and/or a photograph or a participant's supervisor and/or a photograph of a place of work of a participant 102 and/or 104 and/or 106 and/or 108 and/or 202. The auxiliary information may also include an IP address and/or a telephone number and/or a name and/or an identifier with which a participant 102 and/or 104 and/or 106 and/or 108 and/or 202 is associated, and/or an IP address and/or a telephone number and/or a name and/or an identifier with which a person and/or an entity with which a participant 102 and/or 104 and/or 106 and/or 108 and/or 202 is associated, such as an IP address of a computer of a participant 102 and/or 104 and/or 106 and/or 108 and/or 202, a telephone number of a supervisor of a participant 102 and/or 104 and/or 106 and/or 108 and/or 202, a name of an employer of a participant 102 and/or 104 and/or 106 and/or 108 and/or 202, or an identifier representing the relationship of a participant 102 and/or 104 and/or 106 and/or 108 and/or 202 to another person and/or entity (such as "client" or "wife"). search In the context of the exemplary environment 100, operation 302 may include, for instance, retrieving auxiliary information correlated and/or provisionally correlated with the component information. In one example of the operation 302, and continuing the foregoing example of operation 300, in one specific example of retrieving the auxiliary information correlated with the sonic frequency spectrum information and the name "David Bowman", VoIP-enabled computer 114 retrieves data that matches the sonic frequency spectrum information and data indexed by the name of "David Bowman." In one specific example of retrieving information provisionally correlated with the sonic frequency spectrum information and the name "David Bowman," VoIP-enabled computer 114 retrieves data having an attenuated/diluted/noisy linkage with the sonic frequency spectrum information and the name "David Bowman." For example, VoIP-enabled computer 114 might search for data having some content and/or indexing at least partially formed by vocal sonic frequency spectrum information and/or the name "David Bowman." As an example of content, VoIP-enabled computer 114 might search a data store of voiceprints including vocal sonic frequency spectrum information labeled in part with the name of the person whose voice is characterized by the voiceprint and/or a data store of digital still images correlated with the name "David Bowman," such as a digital still image labeled with the names of the person or persons imaged in the digital still image. As an example of data having some indexing at least partially formed by the name "David Bowman," VoIP-enabled computer 114 might search data stores of voiceprints and/or images having respective indices such as "David Bowman, resident of Los Angeles," "David Bowman, resident of San Francisco," "David Bowman, resident of Bakersfield," etc.

The retrieving of operation 302 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Operation 304 illustrates presenting the component information and/or the auxiliary information. Operation 304 may include, for example, presenting the component information and/or the auxiliary information, where the presenting may include presenting an item of component information and/or an item of auxiliary information visually using a visual presentation device such as a computer screen and/or a telephone display screen. Further, the presenting may include presenting an item of component information and/or an item of auxiliary information sonically using a sonic presentation device such as a microphone operably coupled to a computer or to a telephone. In addition, the presenting may include presenting an item of component information and/or an item of auxiliary information in a tactile manner using a tactile presentation device such as a device that vibrates and/or shakes a computer mouse or a telephone.

The presenting of operation 304 may be performed automatically or may be performed in response to receiving input from a computer and/or telephone user. Such input may include but not be limited to a user hovering a cursor over an appropriate area on a computer and/or telephone screen to have desired information presented. Such input may also include but not be limited to a user entering input via, e.g., a keyboard, a computer mouse, a touchpad, a microphone, or other computer input devices, to command the presenting of operation 304 via a presentation device in the proximity of a user providing and/or via a presentation device remote from a user providing input, e.g., a display screen/microphone at a remote location. Automatic performance may include presentation of an item of component information and/or an item of auxiliary information in "real-time" as such information is received and/or retrieved.

In the context of exemplary environment 100, operation 304 may include, for example, presenting the component information and/or the auxiliary information. In one example of operation 304, and continuing with the foregoing specific example of operations 300 and 302, in one specific example of presenting the component information and/or the auxiliary information, VoIP-enabled computer 114 may present (e.g., via a speaker and/or a graphical user interface) the component information, in this example, the sonic frequency spectrum information and the name from the email, "David Bowman." In addition, VoIP-enabled computer 114 may present (e.g., via a speaker and/or a graphical user interface) the auxiliary information, in this example, the voiceprints and the digital still images and their respective labels and/or indexing retrieved in operation 302.

Further, still continuing with the foregoing specific example of operation 302, in one specific example of presenting the component information and/or the auxiliary information, more information may be needed to correlate more confidently the auxiliary information with the component information. To correlate more confidently the auxiliary information with the component information, VoIP-enabled computer 114 may prompt for input of additional information from, e.g., participant 102, and/or may consider together more than one search and/or search result to narrow a range of provisional correlations. Continuing with the specific example of operations 300 and 302, describing content correlated with the sonic frequency spectrum information and the name "David Bowman" as an example of "provisionally correlated," in one implementation, VoIP-enabled computer 114 may pair or match the voiceprint and the digital still image with the sonic frequency spectrum information from the audio component and the name from the email and query the participant 102, "Is this him?" through, e.g., a graphical user interface, to which participant 102 may respond as appropriate (e.g., "yes," "no," "to a 95% confidence," etc.). Thereafter, VoIP-enabled computer 114 will be able to use participant 102's answers in later searching, ensuring more accuracy. Continuing with the operation 302 example describing data having some labeling and/or indexing at least partially formed by the name "David Bowman," VoIP-enabled computer 114 may present a selection of voiceprints and thumbnail presentations of digital still images from which participant 102 may select the most appropriate to correlate with the sonic frequency spectrum information from the audio component and the name "David Bowman" from the email.

Continuing to refer to FIG. 3, the following specific examples pertain to operations 300, 302, and 304 in the context of exemplary environment 200 (illustrated in FIG. 2).

Operation 300 may include receiving component information from a discourse component, and a computer 204 may receive the component information. Participant 202 participates in a discourse including a conference call in which participant 202 provides information to one or more recipients who receive the information only and do not provide information to participant 202 (e.g., a presentation by participant 202 to one or more other silent participants). In this example, the computer 204 receives from participant 202 input via various devices discourse components including an audio component, such as a signal carrying the speech of participant 202, and a video component, such as a signal carrying the image of participant 202. The computer 204 receives the component information from the discourse components, including, e.g., voice-characterizing information (e.g., sonic frequency spectrum information) from the audio component and face-characterizing information (e.g., facial recognition features) from the video component. Upon receipt, participant 202 indicates to computer 204 through some means (e.g., a voice and/or graphical user interface) that participant 202 is interested in any additional information that computer 204 could supply regarding himself (participant 202), using the component information, for, e.g., archiving, current and/or future reference, and/or provision for present and future audiences of the discourse.

Continuing the foregoing example of operation 300 in the context of exemplary environment 200, operation 302 may include retrieving auxiliary information correlated and/or provisionally correlated with the component information, and computer 204 may retrieve the auxiliary information. In one specific example of retrieving the auxiliary information correlated with the component information, computer 204 retrieves data that matches the sonic frequency spectrum information and the facial recognition features. As an example of content, computer 204 might search a data store of voiceprints and a data store of facial images labeled with the name of the person whose voice is characterized by the voiceprint and the name of the person imaged, respectively, for matches with the component information and might retrieve the name "Frank Poole." In one specific example of retrieving information provisionally correlated with the sonic frequency spectrum information and the facial recognition features, computer 204 retrieves data having an attenuated/diluted/noisy linkage with the sonic frequency spectrum information and the facial recognition features. For example, computer 204 might search a data store of voiceprints and a data store of facial images, including voiceprints and facial images labeled with the name of the person whose voice is characterized by the voiceprint and by the name of the person imaged, respectively. As an example of data having such an attenuated/diluted/noisy linkage with the sonic frequency spectrum information and the facial recognition features, the computer 204 might search data stores having voiceprints and images with indices such as "Frank Poole, employee of Acme Company," "Frank Poole, resident of San Francisco," "Frank Poole, officer of Beta Corporation," etc.

Continuing the foregoing example of operations 300 and 302 in the context of exemplary environment 200, operation 304 may include presenting the component information and/or the auxiliary information, and computer 204 may present the component information and/or the auxiliary information. In one specific example of presenting the component information and/or the auxiliary information, computer 204 may present (e.g., via a speaker and/or a graphical user interface) the component information, in this example, the sonic frequency spectrum information and the facial recognition features. Further, computer 204 may present (e.g., via a speaker and/or a graphical user interface) the auxiliary information, the voiceprints and the facial images and their respective labeling and/or indexing, including the name "Frank Poole."

Further, still continuing with the foregoing specific example of operations 300 and 302 in the context of exemplary environment 200, in one specific example of presenting the component information and/or the auxiliary information, more information may be needed to correlate more confidently the auxiliary information with the component information. To correlate more confidently the auxiliary information with the component information, computer 204 may prompt for input of additional information from, e.g., participant 202, and/or may consider together more than one search and/or search result to narrow a range of provisional correlations. Continuing with the operation 302 example in the context of exemplary environment 200, describing content correlated with the sonic frequency spectrum information and the facial recognition features as an example of "provisionally correlated," in one implementation, computer 204 may connect the name "Frank Poole" with the sonic frequency spectrum information and the facial recognition features and query the participant 202, "Is this the person speaking?" and "Is this the person pictured?" through, e.g., a graphical user interface. The participant 202 may respond as appropriate (e.g., "yes," "no,", "to an 80% confidence," etc.). Thereafter, the computer 204 will be able to use participant 202's answers in later searching, ensuring more accuracy. Continuing with the operation 302 example in the context of exemplary environment 200, describing data having some indexing at least partially formed by the name "Frank Poole," computer 204 may present a selection of voiceprints and thumbnail presentations of facial images from which participant 202 may select the most appropriate to match the sonic frequency spectrum information from the speech of participant 202 and the facial recognition features of the video of participant 202.

In another example, the computer 120 receives component information from a discourse component including an audio component and a video component, such as voice-characterizing information and face-characterizing information, and retrieves auxiliary information correlated with and/or provisionally correlated with the component information, such as a list having one or more names correlated with and/or provisionally correlated with the voice-characterizing information and a list having one or more names correlated with and/or provisionally correlated with the face-characterizing information. Further, in this example, computer 120 presents the two lists having one or more names for inspection during the discourse in response, e.g., to automatic input from hardware/software/firmware operably coupled to computer 120 and/or to another system such as VoIP-enabled computer 114, and/or in response to input from a user such as participant 104 and/or participant 106 via computer 120 and/or in response to input from, e.g., participant 108 via computer 124.

The presenting of operation 304 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Figure 4A:
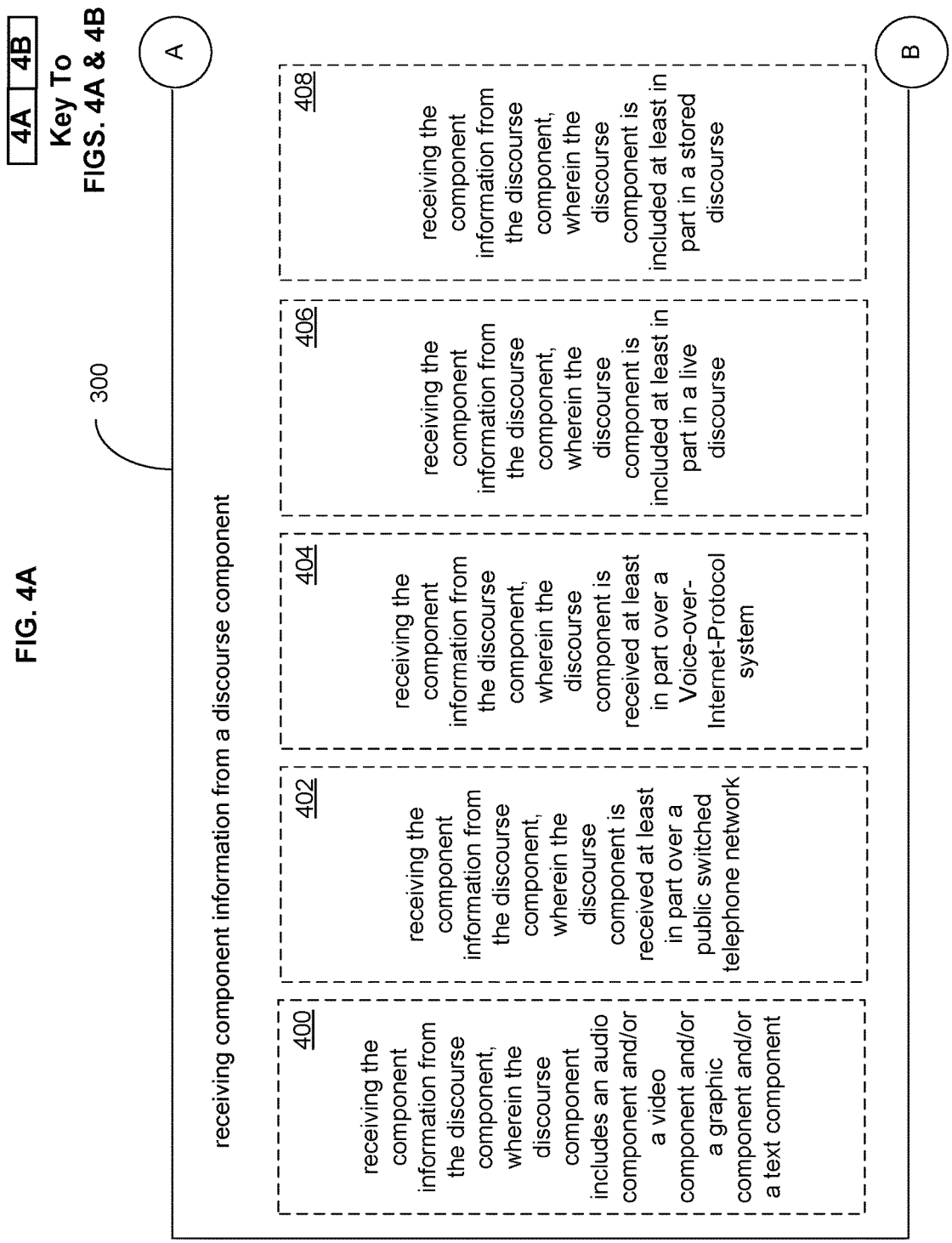

FIG. 4 illustrates a high-level logic flowchart of an operational process. Operation 300—receiving component information from a discourse component—may include one or more of the following operations: 400, 402, 404, 406, 408, 410, 412, 414, 416, and/or 418.

Operation 400 illustrates receiving the component information from the discourse component, wherein the discourse component includes an audio component and/or a video component and/or a graphic component and/or a text component. Operation 400 may include, for instance, receiving the component information from the discourse component, wherein the discourse component includes an audio component and/or a video component and/or a graphic component and/or a text component, where the discourse component may include an audio component such as a voice of a participant 102 and/or 104 and/or 106 and/or 108 and/or 202 and/or a stored voice played back by or as a response to input from a participant 102 and/or 104 and/or 106 and/or 108 and/or 202, and the component information may include a particular word and/or a particular voice pattern that may be recognized to identify the speaker and/or to recall a map showing a location spoken by the voice. Further, the discourse component may include a video component such as a streaming and/or stored video of a participant 102 and/or 104 and/or 106 and/or 108 and/or 202 and/or a stored video played back in response to input from a participant 102 and/or 104 and/or 106 and/or 108 and/or 202, and the component information may include an image such as an image of a face that may be recognized to identify a person portrayed by the image. In addition, the discourse component may include a graphic component such as a graphics file and/or a facsimile and the component information may include an item such as an organizational chart and/or a social network diagram and/or a map and/or a graphic depiction of a face that may be used by a participant 102 and/or 104 and/or 106 and/or 108 and/or 202 to supplement the content of the discourse. Further, the discourse component may include a text component such as a MICROSOFT® WORD document and the component information may include a word and/or a phrase that could be used to identify and/or to locate a participant 102 and/or 104 and/or 106 and/or 108 and/or 202.

In the context of the exemplary environment 100, operation 400 may include, for instance, receiving the component information from the discourse component, wherein the discourse component includes an audio component and/or a video component and/or a graphic component and/or a text component. In one specific example of operation 400, and continuing the foregoing example of operation 300, during a conference call participant 104 directs computer 120 to transmit to participant 102, through VoIP-enabled computer 114, discourse components including an audio component, a video component, a graphic component, and a text component. The audio component includes a signal carrying the voice of participant 104, the video component includes a signal carrying a live video image and/or a digital still image of the participant 104, the graphic component includes a graphic image of a company logo, and the text component includes text in an email (or, alternatively, e.g., a MICROSOFT® WORD document or a Portable Document Format ("PDF") file). The VoIP-enabled computer 114 receives the discourse components and receives the component information from the discourse components, including, e.g., voice-characterizing information including sound frequency spectrum information from the audio component, face-characterizing information including facial recognition features from the video component, graphic information including the company logo from the graphic component, and the name "David Bowman" from the text component. Upon receipt, participant 102 indicates to VoIP-enabled computer 114 through some means (e.g., a voice and/or graphical user interface) that participant 102 is interested in any additional information that VoIP-enabled computer 114 could supply regarding participant 104 using the component information.

In another example discourse in which the participants 102 and/or 104 and/or 106 and/or 108 are participating, the VoIP-enabled computer 114 associated with the participant 102 receives component information from discourse components including an audio component, e.g., a signal representing a voice of the participant 108, and/or a video component, e.g., a signal representing the video image of participants 104 and 106, and/or a graphic component, e.g., a signal representing a social network chart sent by the computer 124 associated with the participant 108, and/or a text component, e.g., an instant message sent from the telephone 122 associated with the participant 108.

The receiving of operation 400 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Operation 402 shows receiving the component information from the discourse component, wherein the discourse component is received at least in part over a public switched telephone network. The receiving of operation 402 may include receiving the component information from the discourse component, wherein the discourse component is received at least in part over a public switched telephone network, where the discourse may be conducted at least in part over the PSTN 112 and may use the VoIP-enabled computer 114 and/or telephone 116 and/or VoIP-enabled telephone unit 118 and/or computer 120 and/or the telephone 122 and/or the computer 124 for a discourse including one or more of the participants 102 and/or 104 and/or 106 and/or 108 and/or 202.

In the context of the exemplary environment 100, operation 402 may include, for example, receiving the component information from the discourse component, wherein the discourse component is received at least in part over a public switched telephone network. In one specific example of operation 402, and continuing the foregoing example of operation 300, the conference call in which the participant 102 and the participant 104 are participating is taking place at least in part over the PSTN 112. The discourse components are received by VoIP-enabled computer 114 at least in part over the PSTN 112, and the component information is received by VoIP-enabled computer 114 from the discourse components. The PSTN 112 may include hardware/software/firmware associated with and/or operably coupled to VoIP-enabled computer 114 and/or computer 120 and/or the network 110 and/or PSTN 112.

In another example discourse in which the participants 102 and/or 104 and/or 106 and/or 108 are participating, the VoIP-enabled telephone unit 118 associated with the participants 104 and 106 receives component information from discourse components in which the discourse is conducted at least in part over the PSTN 112.

The receiving of operation 402 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Operation 404 illustrates receiving the component information from the discourse component, wherein the discourse component is received at least in part over a Voice-over-Internet-Protocol system. The receiving of operation 404 may include receiving the component information from the discourse component, wherein the discourse component is received at least in part over a Voice-over-Internet-Protocol system, where the VoIP system uses the network 110 and/or the PSTN 112 and/or the VoIP-enabled computer 114 and/or telephone 116 and/or VoIP-enabled telephone unit 118 and/or computer 120 and/or the telephone 122 and/or the computer 124 for a discourse including one or more of the participants 102 and/or 104 and/or 106 and/or 108. In the context of the exemplary environment 100, operation 404 may include, for example, receiving the component information from the discourse component, wherein the discourse component is received at least in part over a Voice-over-Internet-Protocol system. In one specific example of operation 404, and continuing the forgoing example of operation 300, the conference call in which the participant 102 and the participant 104 are participating is taking place over at least in part over a Voice-over-Internet-Protocol system. The discourse components are received by VoIP-enabled computer 114 at least in part over the Voice-over-Internet-Protocol system, and the component information is received by VoIP-enabled computer 114 from the discourse components. Such a Voice-over-Internet-Protocol system may include hardware/software/firmware associated with and/or operably coupled to VoIP-enabled computer 114 and/or computer 120 and/or the network 110 and/or PSTN 112.

The receiving of operation 404 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Operation 406 illustrates receiving the component information from the discourse component, wherein the discourse component is included at least in part in a live discourse. Operation 406 may include, for instance, receiving the component information from the discourse component, wherein the discourse component is included at least in part in a live discourse, where one or more participants 102 and/or 104 and/or 106 and/or 108 and/or 202 communicate in real time, e.g., their communication is not a play-back of a stored communication. In the context of the exemplary environment 100, operation 406 may include, for example, receiving the component information from the discourse component, wherein the discourse component is included at least in part in a live discourse. In one specific example of operation 406, and continuing the foregoing example of operation 300, the participant 102 and the participant 104 are participating in the conference call live (e.g., in real time) and not, e.g., via a recording. In this example of operation 406, the discourse components are received by VoIP-enabled computer 114 live as the participant 104 contributes the discourse components during the live discourse, and the component information is received by VoIP-enabled computer 114 from the discourse components.

The receiving of operation 406 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Operation 408 depicts receiving the component information from the discourse component, wherein the discourse component is included at least in part in a stored discourse. Operation 408 may include, for example, receiving the component information from the discourse component, wherein the discourse component is included at least in part in a stored discourse, where one or more participants 102 and/or 104 and/or 106 and/or 108 and/or 202 communicate using a play-back of a stored communication.

In the context of the exemplary environment 100, operation 408 may include, for example, receiving the component information from the discourse component, wherein the discourse component is included at least in part in a stored discourse. In one specific example of operation 408, and continuing the foregoing example of operation 300, the participant 102 and/or the participant 104 are participating in the conference call by means of stored contributions, e.g., recorded speeches and/or videos and/or graphics transmissions and/or text transmissions. In this example of operation 408, the discourse components are contributed as part of a recorded presentation and are received by VoIP-enabled computer 114, and the component information is received by VoIP-enabled computer 114 from the discourse components.

In another example, where, in a discourse in which the participants 102 and/or 104 and/or 106 and/or 108 are participating, the computer 120 associated with the participants 104 and 106 receives component information from discourse components for which the discourse is at least in part a stored discourse, e.g., a discourse in which at least part of a discourse component is a play-back of stored information. The receiving of operation 408 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Operation 410 shows receiving the component information including voice-characterizing information. Operation 410 my include, for example, receiving the component information including voice-characterizing information, where the component information may include voice-characterizing information that may be used by a voice recognition system to identify a candidate identity and/or identities of a speaker, and where the voice recognition system includes hardware/software/firmware associated with or operably coupled to the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or the computers 204.

In the context of the exemplary environment 100, operation 410 may include, for example, receiving the component information including voice-characterizing information. In one specific example of operation 410, and continuing the foregoing example of operation 300, VoIP-enabled computer 114 receives from computer 120 discourse components including an audio component, and receives component information from the discourse component. The component information includes, e.g., voice-characterizing information such as sound frequency spectrum information that may be analyzed to identify the speaker, here, participant 104, or to identify a number of speakers whose voices provisionally match the voice of participant 104 or a pattern in the voice of participant to some level of confidence, e.g., 80% confidence.

In another example discourse in which the participants 102 and/or 104 and/or 106 and/or 108 are participating, the computer 120 receives component information including voice-characterizing information such as audio information sufficient for a voice-recognition system to analyze the voice-characterizing information to identify the speaker.

The receiving of operation 410 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Operation 412 depicts receiving the component information including word-characterizing information. Operation 412 may include, for example, receiving the component information including word-characterizing information, where the component information may include word-characterizing information that may be used by a word recognition system to identify a spoken word in a live or recorded audio component and/or a textual word in a text component and/or a graphical word in a graphical component, and where the word recognition system includes hardware/software/firmware associated with or operably coupled to the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or the computers 204.

In the context of the exemplary environment 100, operation 412 may include, for example, receiving the component information including word-characterizing information. In one specific example of operation 412, and continuing the foregoing example of operation 300, VoIP-enabled computer 114 receives from computer 120 discourse components including an audio component and a graphic component, and receives the component information from the discourse components. The component information includes, e.g., audio word-characterizing information that may be analyzed to identify spoken words, here, spoken by participant 104, and graphic word-characterizing information that may be analyzed to identify words in a graphic image such as the company logo in the graphic component.

In another example discourse in which the participants 102 and/or 104 and/or 106 and/or 108 are participating, the computer 124 receives component information including word-characterizing information such as audio information sufficient for a word-recognition system to analyze the word-characterizing information to identify an individual word. The receiving of operation 412 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Operation 414 shows receiving the component information including location-characterizing information. Operation 414 my include, for example, receiving the component information including location-characterizing information, where the component information may include location-characterizing information that may be used by a location-recognition system to identify a location from, e.g., a spoken word or phrase in an audio component and/or a textual and/or graphical and/or video word or phrase such as a street address and/or a place name and/or a set of geographical coordinates, and where the location recognition system includes hardware/software/firmware associated with or operably coupled to the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or the computers 204. In the context of the exemplary environment 100, operation 414 may include, for example, receiving the component information including location-characterizing information. In one specific example of operation 414, and continuing the foregoing example of operation 300, VoIP-enabled computer 114 receives from computer 120 discourse components including an audio component, a graphic component, and a text component, and receives the component information from the discourse components. The component information includes, e.g., audio location-characterizing information, e.g., spoken location designations, that may be analyzed to identify spoken words that pertain to locations, such as numerals spoken along with words designating streets, e.g., "1000 Imperial Boulevard," and/or building names, e.g., "Acme Building," and/or geographical features, e.g. "Mount Hood," etc. The component information also includes, e.g., graphic location-characterizing information, e.g., graphically-presented location designations and/or direction information that may be analyzed to identify graphic indications of locations, e.g., a map indicating a location of a corporate campus and/or directions from an airport to the corporate campus. The component information also includes, e.g., text location-characterizing information, e.g., textually-presented location designations and/or direction information that may be analyzed to identify textual indications of locations included in an email, e.g., geographical coordinates (such as latitude, longitude, and altitude) and/or textual directions from one office complex to another.

In another example discourse in which the participants 102 and/or 104 and/or 106 and/or 108 are participating, the VoIP-enabled computer 114 receives component information including location-characterizing information such as audio and/or video and/or graphic and/or text information sufficient for a system designed to recognize audio and/or video and/or graphic and/or text information specifying a location to analyze the location-characterizing information to identify an individual location by name and/or by directions and/or by geographical coordinates.

The receiving of operation 414 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Operation 416 depicts receiving the component information including face-characterizing information. Operation 416 may include receiving the component information including face-characterizing information, where the component information may include face-characterizing information that may be used by a face recognition system to identify a face in a video and/or a graphical component, and where the face recognition system includes hardware/software/firmware associated with or operably coupled to the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or the computers 204. In the context of the exemplary environment 100, operation 416 may include, for example, receiving the component information including face-characterizing information. In one specific example of operation 416, and continuing the foregoing example of operation 300, VoIP-enabled computer 114 receives from computer 120 discourse components including a video component, and receives component information from the discourse components. The component information includes, e.g., video face-characterizing information, e.g., moving and/or still video images of a face of sufficient quality to be analyzed to identify the face as the face of participant 104, for instance, by comparison to stored face-characterizing information pertaining to participant 104.

In another example discourse in which the participants 102 and/or 104 and/or 106 and/or 108 are participating, the computer 120 receives component information including face-characterizing information such as video and/or graphic information sufficient for a face-recognition system to analyze the face-characterizing information to identify an individual face. The receiving of operation 416 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Operation 418 illustrates receiving the component information including an IP address and/or a telephone number and/or a name and/or a nickname and/or a role. Operation 418 may include, for instance, receiving the component information including an IP address and/or a telephone number and/or a name and/or a nickname and/or a role, where the component information may include an IP address associated with, e.g., the VoIP-enabled computer 114, and/or a telephone number associated with, e.g., the telephone 116, and/or a name and/or a nickname and/or a role associated with a participant 102 and/or 104 and/or 106 and/or 108 and/or 202. In the context of the exemplary environment 100, operation 418 may include, for example, receiving the component information including an IP address and/or a telephone number and/or a name and/or a nickname and/or a role. In one specific example of operation of 418, and continuing the foregoing example of operation 300, VoIP-enabled computer 114 receives from computer 120 one or more discourse components including component information. The component information includes, e.g., an Internet Protocol ("IP") address (e.g., 000.000.00.00) and/or a telephone number (e.g., 111-555-1234) and/or a name (e.g., "David Bowman") and/or a nickname (e.g., "the New Guy") and/or a role (e.g., "husband of participant 106," "client of colleague of participant 104," etc.), and serves to identify a participant, e.g., participant 104 and/or a person, entity, and/or communications equipment associated with a participant.

In another example discourse in which the participants 102 and/or 104 and/or 106 and/or 108 are participating, the VoIP-enabled computer 114 receives component information including an IP address (e.g., 0.0.000.000), and/or a telephone number (e.g., 111-123-4567), and/or a name and/or a nickname and/or a role (e.g., "wife of participant 108," "client of colleague of participant 104").

The receiving of operation 418 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Continuing to refer to FIG. 4, the following specific examples pertain to operations 400, 406, 408, 410, 412, 414, and 416 in the context of exemplary environment 200 (illustrated in FIG. 2).

Continuing the foregoing example of operation 300, in one specific example of operation 400, where operation 400 may include receiving the component information from the discourse component, wherein the discourse component includes an audio component and/or a video component and/or a graphic component and/or a text component, computer 204 receives from participant 202 via various input devices discourse components including an audio component, a video component, a graphic component, and a text component. The audio component includes a signal carrying the voice of participant 202, the video component includes a signal carrying a live video image and/or a digital still image of the participant 202, the graphic component includes a graphic image of a company logo, and the text component includes text in an email (or, alternatively, e.g., a MICROSOFT® WORD document or a Portable Document Format ("PDF") file). Computer 204 receives the discourse components and receives the component information from the discourse components, including, e.g., voice-characterizing information including sound frequency spectrum information from the audio component, face-characterizing information including facial recognition features from the video component, graphic information including the company logo from the graphic component, and the name "Frank Poole" from the text component. Upon receipt, participant 202 indicates to computer 204 through some means (e.g., a voice and/or graphical user interface) that participant 202 is interested in any additional information that computer 204 could supply regarding participant 202 (himself) using the component information.

Continuing the foregoing example of operation 300, in one specific example of operation 406, where operation 406 may include receiving the component information from the discourse component, wherein the discourse component is included at least in part in a live discourse, participant 202 is participating in the discourse live (e.g., in real time) and not, e.g., via a recording. In this example of operation 406, the discourse components are received by computer 204 live, as the participant 202 contributes the discourse components during the live discourse, and the component information is received by computer 204 from the discourse components.

Continuing the foregoing example of operation 300, in one specific example of operation 408, where operation 408 may include receiving the component information from the discourse component, wherein the discourse component is included at least in part in a stored discourse, participant 202 is participating in the conference call by means of stored contributions, e.g., recorded speeches and/or videos and/or graphics transmissions and/or text transmissions. In this example of operation 408, the discourse components are contributed as part of a recorded presentation and are received by computer 204, and the component information is received by computer 204 from the discourse components.

Continuing the foregoing example of operation 300, in one specific example of operation 410, where operation 410 may include receiving the component information including voice-characterizing information, computer 204 receives from participant 202 discourse components including an audio component, and receives component information from the discourse component. The component information includes, e.g., voice-characterizing information such as sound frequency spectrum information that may be analyzed to identify the speaker, here, participant 202, or to identify a number of speakers whose voices provisionally match the voice of participant 202 or a pattern in the voice of participant to some level of confidence, e.g., 80% confidence.

Continuing the foregoing example of operation 300, in one specific example of operation 412, where operation 412 may include receiving the component information including word-characterizing information, computer 204 receives from participant 202 discourse components including an audio component and a graphic component, and receives the component information from the discourse components. The component information includes, e.g., audio word-characterizing information that may be analyzed to identify spoken words, here, spoken by participant 202, and graphic word-characterizing information that may be analyzed to identify words in a graphic image such as the company logo in the graphic component.

Continuing the foregoing example of operation 300, in one specific example of operation 414, where operation 414 may include receiving the component information including location-characterizing information, computer 204 receives from participant 202 discourse components including an audio component, a graphic component, and a text component, and receives the component information from the discourse components. The component information includes, e.g., audio location-characterizing information, e.g., spoken location designations, that may be analyzed to identify spoken words that pertain to locations, such as numerals spoken along with words designating streets, e.g., "300 Hill Ave.," and/or building names, e.g., "Omega Building," and/or geographical features, e.g. "Death Valley," etc. The component information also includes, e.g., graphic location-characterizing information, e.g., graphically-presented location designations and/or direction information that may be analyzed to identify graphic indications of locations, e.g., a map indicating a location of a building and/or directions from a train station to the building. The component information also includes, e.g., text location-characterizing information, e.g., textually-presented location designations and/or direction information that may be analyzed to identify textual indications of locations included in a word-processing document, e.g., geographical coordinates (such as latitude, longitude, and altitude) and/or textual directions from one factory to another.

Continuing the foregoing example of operation 300, in one specific example of operation 416, where operation 416 may include receiving the component information including face-characterizing information, computer 204 receives from participant 202 discourse components including a video component, and receives component information from the discourse components. The component information includes, e.g., video face-characterizing information, e.g., moving and/or still video images of a face of sufficient quality to be analyzed to identify the face as the face of participant 202, for instance, by comparison to stored face-characterizing information pertaining to participant 202.

Figure 5A:
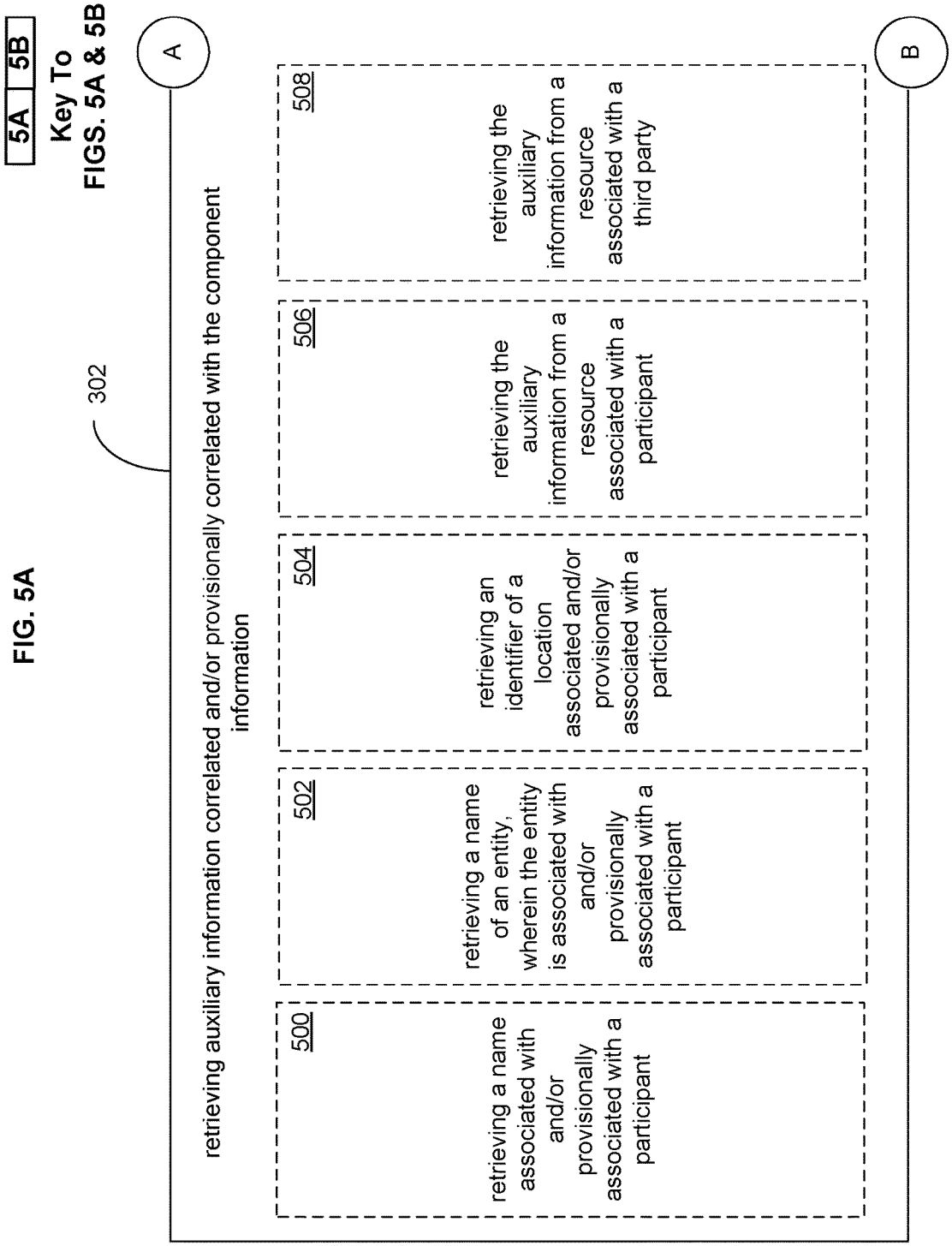

FIG. 5 shows a high-level logic flowchart of an operational process. Operation 302—retrieving auxiliary information correlated and/or provisionally correlated with the component information—may include one or more of the following operations: 500, 502, 504, 506, 508, and/or 510.

Operation 500 depicts retrieving a name associated with and/or provisionally associated with a participant. Operation 500 may include, for instance, retrieving a name associated with and/or provisionally associated with a participant, where the retrieving includes retrieving auxiliary information including one or more names associated with a participant 102 and/or 104 and/or 106 and/or 108 and/or 202 from one or more of a variety of sources including private and public data resources; the one or more names are correlated with one or more items of received component information, such as a name correlated with a video image of a face and/or with an item of voice-characterizing information. The one or more names and/or provisional names may be assessed in order of likelihood and presented with those assessments presented implicitly (as in an ordered list) or explicitly (as with stated probabilities), In the context of the exemplary environment 100, operation 500 may include, for example, retrieving a name associated with and/or provisionally associated with a participant. In one specific example of operation 500, and continuing the foregoing example of operation 302, VoIP-enabled computer 114 retrieves a name associated and/or provisionally associated with the participant 104. VoIP-enabled computer 114 may retrieve, e.g., a name with which a stored voiceprint is indexed, such as "David Bowman," to identify participant 104, where the stored voiceprint matches at some confidence level component information (or a pattern in the component information) including sound frequency spectrum information. In one specific example of retrieving a name provisionally associated with participant 104, VoIP-enabled computer 114 retrieves data having an attenuated/diluted/noisy linkage with participant 104. For example, VoIP-enabled computer 114 might search for and find eight voiceprints that match with an 80% confidence level the sonic frequency spectrum information (or a pattern in the sonic frequency spectrum information) included in the component information. VoIP-enabled computer 114 would, in this example, retrieve the names with which the eight voiceprints are indexed. The VoIP-enabled computer 114 might, in determining the confidence level, activate a search of a networked database provided by a commercial service, activate a commercial search engine, activate a database product, or activate a third party network server.

In another example discourse in which the participants 102 and/or 104 and/or 106 and/or 108 are participating, the computer 120 retrieves auxiliary information including one or more names associated with the participant 102 from one or more of a variety of data sources. In this example the retrieved name or names are correlated with one or more items of received component information, such as a name correlated with a video image of a face and/or with an item of voice-characterizing information.

The retrieving of operation 500 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Operation 502 shows retrieving a name of an entity, wherein the entity is associated with and/or provisionally associated with a participant. Operation 502 may include, for example, retrieving a name of an entity, wherein the entity is associated with and/or provisionally associated with a participant, where the retrieving includes retrieving one or more names or provisional names of entities associated with a participant 102 and/or 104 and/or 106 and/or 108 and/or 202 from one or more of a variety of sources including private and public data resources. In this example, the one or more names are correlated with one or more items of received component information, such as a name of a company and/or an agency and/or an institution with which a participant 102 and/or 104 and/or 106 and/or 108 and/or 202 may be affiliated. The one or more names and/or provisional names may be assessed in order of likelihood and presented with those assessments presented implicitly (as in an ordered list) or explicitly (as with stated probabilities).

In the context of the exemplary environment 100, operation 502 may include, for example, retrieving a name of an entity, wherein the entity is associated with and/or provisionally associated with a participant. In one specific example of operation 502, and continuing the foregoing example of operation 302, VoIP-enabled computer 114 retrieves a name of an entity associated and/or provisionally associated with the participant 104. VoIP-enabled computer 114 may retrieve, e.g., a name of a company which is included in the indexing for a voiceprint whose indexing also includes the name "David Bowman," such as an index "David Bowman, employee, Acme Corporation." In one specific example of retrieving a name of an entity provisionally associated with participant 104, VoIP-enabled computer 114 retrieves data having an attenuated/diluted/noisy linkage with one or more entity names included in data entries also including the name "David Bowman," such "David Bowman, employee, Acme Corporation," "David Bowman, division chief, Beta Corporation," "David Bowman, CEO, Gamma Corporation," etc.

In another example discourse in which the participants 102 and/or 104 and/or 106 and/or 108 are participating, the computer 120 retrieves auxiliary information including one or more names associated with and/or provisionally associated with an entity, where the entity is associated with and/or provisionally associated with the participant 108 (e.g., the employer of participant 108 or her doctor or the law firm representing her) from one or more of a variety of data sources. In this example the retrieved name or names are correlated with one or more items of received component information, such as a name correlated with a video image of the face of participant 108 and/or with an item of voice-characterizing information of the voice of the participant 108.

The retrieving of operation 502 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Operation 504 illustrates retrieving an identifier of a location associated with and/or provisionally associated with a participant. Operation 504 may include, for example, retrieving an identifier of a location associated with and/or provisionally associated with a participant, where the retrieving includes retrieving an identifier and/or provisional identifier of a location such as a place name and/or an address and/or a set of geographical coordinates, from one or more of a variety of sources including private and public data resources. In this example, the one or more identifiers and/or provisional identifiers are correlated with one or more of the items of received component information such as a spoken and or text and/or graphical business name and/or place name. The one or more identifiers and/or provisional identifiers may be assessed in order of likelihood and presented with those assessments implicitly (as in an ordered list) or explicitly (as with stated probabilities). Further, the identifier and/or the provisional identifier may be used to retrieve one or more maps and/or pictures showing the location search.

In the context of the exemplary environment 100, operation 504 may include, for example, retrieving an identifier of a location associated with and/or provisionally associated with a participant. In one specific example of operation 504, and continuing the foregoing example of operation 302, VoIP-enabled computer 114 retrieves an identifier of a location that is associated with and/or provisionally associated with participant 104. VoIP-enabled computer 114 may retrieve, for example, a building name and/or an address and/or geographical coordinates (such as latitude, longitude, and altitude) which are included in the indexing for a digital still image whose indexing also includes the name "David Bowman," such as an index "David Bowman, Acme Building, 1 Acme Center, Los Angeles Calif." In one specific example of retrieving an identifier of a location provisionally associated with participant 104, VoIP-enabled computer 114 retrieves data having an attenuated/diluted/noisy linkage with participant 104, such as "1 Acme Center, Los Angeles Calif." from a database that contains entries for "David Bowman, 1 Acme Center, Los Angeles Calif.," "David Bowman, 100 Imperial Way, San Francisco Calif.," "David Bowman, 300 Hill Ave., San Francisco Calif.," etc.

In another example discourse in which the participants 102 and/or 104 and/or 106 and/or 108 are participating, the computer 124 retrieves auxiliary information including one or more locations associated with and/or provisionally associated with the participant 106 (e.g., the place of employment of participant 106 or the location of her doctor or her vacation location) from one or more of a variety of data sources. In this example the retrieved location or locations are correlated with one or more items of received component information, such as a name correlated with a video image of the backdrop of participant 106 and/or with an item of voice-characterizing information of the voice of the participant 106.

The retrieving of operation 504 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Operation 506 shows retrieving the auxiliary information from a resource associated with a participant. Operation 506 may include, for example, retrieving the auxiliary information from a resource associated with a participant, where the retrieving includes retrieving the auxiliary information from, e.g., a database and/or from stored records maintained by one or more of the participants 102 and/or 104 and/or 106 and/or 108 and/or 202.

In the context of the exemplary environment 100, operation 506 may include, for example, retrieving the auxiliary information from a resource associated with a participant. In one specific example of operation 504, and continuing the foregoing example of operation 302, VoIP-enabled computer 114 retrieves the auxiliary information from a resource associated with a participant, such as a database maintained and controlled by participant 102 or a database maintained and controlled by the employer of participant 104. In this specific example of operation 506, such a resource may include a database containing information about clients, customers, and business associates, including names, photographs, voiceprints, addresses, etc.

In another example discourse in which the participants 102 and/or 104 and/or 106 and/or 108 are participating, the computer 124 retrieves auxiliary information from, e.g., a database associated with participant 104 (e.g., a database maintained by the employer of participant 104). Further, operation 506 may include, for example, retrieving the auxiliary information from a resource associated with a participant, where, in a discourse in which the participants 102 and/or 104 and/or 106 and/or 108 are participating, the VoIP-enabled computer 114 retrieves the auxiliary information from, e.g., a database associated with participant 102 (e.g., a database maintained by the employer of participant 102). The retrieving of operation 506 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Operation 508 depicts retrieving the auxiliary information from a resource associated with a third party. Operation 508 may include, for example, retrieving the auxiliary information from a resource associated with a third party, where the retrieving includes retrieving the auxiliary information from, e.g., a database and/or from stored records maintained by a third party not including the participants 102 and/or 104 and/or 106 and/or 108 and/or 202, such as a commercial records firm which charges a fee for access.

In the context of the exemplary environment 100, operation 508 may include, for example, retrieving the auxiliary information from a resource associated with a third party. In one specific example of operation 508, and continuing the foregoing example of operation 302, VoIP-enabled computed 114 retrieves the auxiliary information from a resource associated with a third party, such as a commercial database maintained and controlled by a commercial concern that grants access to the database for a fee.

In another example discourse in which the participants 102 and/or 104 and/or 106 and/or 108 are participating, the VoIP-enabled computer 114 retrieves auxiliary information from, e.g., a commercial database (e.g., a database maintained by a commercial entity who charges for access). The retrieving of operation 508 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Operation 510 illustrates retrieving the auxiliary information from a public resource. Operation 510 may include, for instance, retrieving the auxiliary information from a public resource, where the retrieving includes retrieving the auxiliary information from, e.g., a database and/or from stored records maintained at a publicly accessible website.

In the context of the exemplary environment 100, operation 510 may include, for example, retrieving the auxiliary information from a public resource. In one specific example of operation 510, and continuing the forgoing example of operation 302, VoIP-enabled computed 114 retrieves the auxiliary information from a public resource, e.g., a database that is available to the public, such as www.wikipedia.org, an online encyclopedia.

In another example discourse in which the participants 102 and/or 104 and/or 106 and/or 108 are participating, the computer 120 retrieves auxiliary information from, e.g., a public database (e.g., a database maintained at a website by an entity who grants access to anyone).

The retrieving of operation 510 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Continuing to refer to FIG. 5, the following specific examples pertain to operations 500, 502, 504, 506, 508, and 510 in the context of exemplary environment 200 (illustrated in FIG. 2).

Continuing the foregoing example of operation 302, in one specific example of operation 500, where operation 500 may include retrieving a name associated with and/or provisionally associated with a participant, computer 204 retrieves a name of an entity associated and/or provisionally associated with participant 202. Computer 204 may retrieve, for example, a name with which a stored voiceprint is indexed, such as "Frank Poole," to identify participant 202, where the stored voiceprint matches at some confidence level, component information, (or a pattern in the component information) including sound frequency spectrum information. In one specific example of retrieving a name provisionally associated with participant 202, computer 204 retrieves data having an attenuated/diluted/noisy linkage with participant 202. For example, computer 204 might search for and find six voiceprints that match with a 70% confidence level the sonic frequency spectrum information (or a pattern in the frequency spectrum information) included in the component information. Computer 204 would, in this example, retrieve the names with which the six voiceprints are indexed. The computer 204 may, include in determining the confidence level, activate a search of a networked database provided by a commercial service, activate a commercial search engine, activate a database product, or activate a third party network server.

Continuing the foregoing example of operation 302, in one specific example of operation 502, where operation 502 may include retrieving a name of an entity, wherein the entity is associated with and/or provisionally associated with a participant, computer 204 retrieves a name of an entity associated and/or provisionally associated with participant 202. Computer 204 may retrieve, for example, a name of a company which is included in the indexing for a facial image, such as an index "Frank Poole, employee, Delta Company." In one specific example of retrieving a name of an entity provisionally associated with participant 202, computer 204 retrieves one or more entity names included in indexes for facial images matching the facial recognition features at some level of confidence (e.g., 80%), such as "Frank Poole, associate, Epsilon Law Firm," "Frank Poole, partner, Zeta Law Firm," "Frank Poole, senior partner, Eta Law Firm," etc.

Continuing the foregoing example of operation 302, in one specific example of operation 504, where operation 504 may include retrieving an identifier of a location associated with and/or provisionally associated with a participant, computer 204 retrieves an identifier of a location associated and/or provisionally associated with participant 202. Computer 204 may retrieve, for example, a building name and/or an address and/or geographical coordinates (such as latitude, longitude, and altitude) which are included in the indexing for a facial image matching the facial recognition features of the component information such as an index "Frank Poole, Omega Building, 1 Terminal Road, Los Angeles Calif." In one specific example of retrieving an identifier of a location provisionally associated with participant 202, computer 204 retrieves data having an attenuated/diluted/noisy linkage with participant 202, such as 1 Terminal Road, Los Angeles Calif.," from a database that includes facial images matching the facial recognition features of the component information and indexed with indexes including "Frank Poole, 1 Terminal Road, Los Angeles Calif.," "Frank Pool, 302 Desert Way, San Diego Calif.," "Frank Poole, 542 Imperial Way, San Francisco Calif.," etc.

Continuing the foregoing example of operation 302, in one specific example of operation 506, where operation 506 may include retrieving the auxiliary information from a resource associated with a participant, computer 204 retrieves the auxiliary information from a resource associated with participant 202, such as a database maintained and controlled by participant 202 or by the employer of participant 202. In this specific example of operation 506, such a resource may include a database containing information about clients, customers, employees, and business associates, including names, photographs, voiceprints, addresses, etc.

Continuing the foregoing example of operation 302, in one specific example of operation 508, where operation 508 may include retrieving the auxiliary information from a resource associated with a third party, computer 204 retrieves the auxiliary information from a resource associated with a third party, such as a commercial database maintained and controlled by a commercial concern that grants access to the database for a fee.

Continuing the foregoing example of operation 302, in one specific example of operation 510, where operation 510 may include retrieving the auxiliary information from a public resource, computer 204 retrieves the auxiliary information from a public resource, e.g., a data store that is available to the public, such as a freely available weblog.

FIG. 6 illustrates a high-level logic flowchart of an operational process. The depicted process may include operation 300 (described herein), operation 302 (described herein), operation 304 (described herein), operation 600, and/or operation 602.

Operation 600 shows storing the component information to populate a data template associated with a participant. Operation 600 may include, for instance, storing the component information to populate a data template associated with a participant, where the storing includes storing the component information in a data template such as a Versitcard (herein, "vCard") format and/or a custom-designed data structure for future reference. Such a data template may be presented visually and/or sonically and/or by tactile presentation to a participant 102 and/or 104 and/or 106 and/or 108 and/or 202 during a discourse for storage of the component information therein. Such a data template may also be recalled by a participant 102 and/or 104 and/or 106 and/or 108 and/or 202 during a discourse for reference to data stored therein. In the context of the exemplary environment 100, operation 600 may include, for example, storing the component information to populate a data template associated with a participant. In one specific example of operation 600, and continuing the foregoing example of operation 300, participant 102 may use VoIP-enabled computer 114 to store the component information in memory resources associated with VoIP-enabled computer 114 and/or operably coupled to VoIP-enabled computer 114. VoIP-enabled computer 114 stores the component information to populate a data template such as a Versitcard (herein, "vCard") format and/or a custom-designed data structure for current and future reference. VoIP-enabled computer 114 may, for instance, present via a graphical user interface a set of fields for participant 102 to fill by entering the component information in the appropriate fields.

The storing of operation 600 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Operation 602 illustrates storing the auxiliary information to populate a data template associated with a participant. Operation 602 may include, for example, storing the auxiliary information to populate a data template associated with a participant, where the storing includes storing of the auxiliary information in a data template such as a vCard format and/or a custom-designed data structure for future reference. Such a data template may be presented visually and/or sonically and/or by tactile presentation to a participant 102 and/or 104 and/or 106 and/or 108 and/or 202 during a discourse for storage of the auxiliary information therein. Such a data template may also be recalled by a participant 102 and/or 104 and/or 106 and/or 108 and/or 202 during a discourse for reference to data stored therein.

In the context of the exemplary environment 100, operation 602 may include, for example, storing the auxiliary information to populate a data template associated with a participant. In one specific example of operation 602, and continuing the foregoing example of operation 302, participant 102 may use VoIP-enabled computer 114 to store the auxiliary information in memory resources associated with VoIP-enabled computer 114 and/or operably coupled to VoIP-enabled computer 114. VoIP-enabled computer 114 stores the auxiliary information to populate a data template such as a vCard format and/or a custom-designed data structure for current and future reference. VoIP-enabled computer 114 may, for instance, present via a graphical user interface a set of fields for participant 102 to fill by entering the auxiliary information in the appropriate fields.

In another example discourse in which the participants 102 and/or 104 and/or 106 and/or 108 are participating, the computer 120 stores the auxiliary information in memory resources associated with and/or operably coupled to the computer 120.

The storing of operation 602 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Continuing to refer to FIG. 6, the following specific examples pertain to operations 600 and 602 in the context of exemplary environment 200 (illustrated in FIG. 2).

In one specific example of operation 600, and continuing the specific example of operation 300, operation 600 may include storing the component information to populate a data template associated with a participant. Participant 202 may use computer 204 to store the component information in memory resources associated with computer 204 and/or operably coupled to computer 204. Computer 204 stores the component information to populate a data template such as a vCard format and/or a custom-designed data structure for current and future reference. Computer 124 may, for instance, present via a graphical user interface a set of fields for participant 202 to fill by entering the component information in the appropriate fields.

In one specific example of operation 602, and continuing the specific example of operation 302, operation 602 may include storing the auxiliary information to populate a data template associated with a participant. Participant 202 may use computer 204 to store the auxiliary information in memory resources associated with computer 204 and/or operably coupled to computer 204. Computer 204 stores the auxiliary information to populate a data template such as a vCard format and/or a custom-designed data structure for current and future reference. Computer 204 may, for instance, present via a graphical user interface a set of fields for participant 202 to fill by entering the auxiliary information in the appropriate fields.

Figure 7:
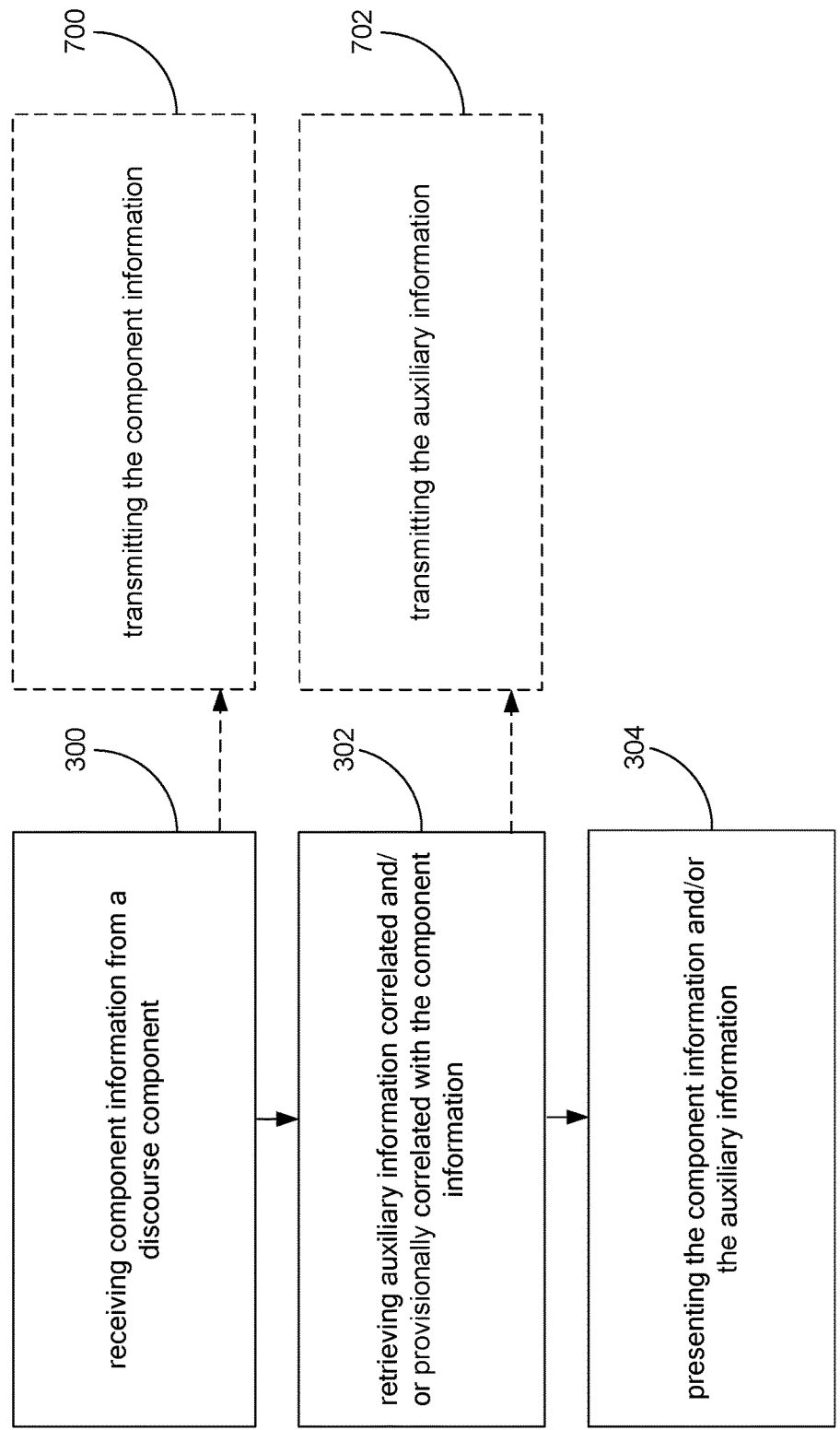
FIG. 7 shows a high-level logic flowchart of an operational process.

FIG. 7 shows a high-level logic flowchart of an operational process. The depicted process may include operation 300 (described herein), operation 302 (described herein), operation 304 (described herein), operation 700, and/or operation 702. Operation 700 shows transmitting the component information. Operation 700 may include, for instance, transmitting the component information (such as word-characterizing information and/or voice-characterizing information), where the transmitting includes the VoIP-enabled computer 114 and/or the telephone 116 transmitting the component information to, for example, the VoIP-enabled telephone unit 118 and/or the computer 124.

In the context of the exemplary environment 100, operation 700 may include, for example, transmitting the component information. In one specific example of operation 700, and continuing the foregoing example of operation 300, participant 102 may use VoIP-enabled computer 114 to transmit the component information to another participant in the conference call, such as participant 108, through computer 124 for participant 108's use.

In another example component information may include information (such as location-characterizing information and/or voice-characterizing information), where, in a discourse in which the participants 102 and/or 104 and/or 106 and/or 108 are participating, the computer 124 and/or the telephone 122 transmits the component information to the VoIP-enabled telephone unit 118 and/or the computer 120 and/or the VoIP-enabled computer 114 and/or the telephone 116. The transmitting of operation 700 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled. Operation 702 illustrates transmitting the auxiliary information. Operation 702 may include, for example, transmitting the auxiliary information (such as a business name and/or a location), where the transmitting includes the telephone 122 and/or the computer 124 transmitting the auxiliary information to the VoIP-enabled telephone unit 118 and/or the computer 120 and/or the VoIP-enabled computer 114 and/or the telephone 116.

In the context of the exemplary environment 100, operation 702 may include, for example, transmitting the auxiliary information. In one specific example of operation 702, and continuing the foregoing example of operation 302, VoIP-enabled computer 114 transmits the auxiliary information to another participant in the conference call, such as participant 108 through computer 124 for participant 108's use.

In another example auxiliary information may include other information such as a person's name and or an employer name), where, in a discourse in which the participants 102 and/or 104 and/or 106 and/or 108 are participating, the transmitting includes the VoIP-enabled telephone unit 118 and/or the computer 120 transmitting the auxiliary information to the VoIP-enabled computer 114 and/or the computer 116 and/or the telephone 122 and/or the computer 124.

The transmitting of operation 702 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 and/or performed using hardware/software/firmware associated with equipment and/or devices with which the network 110 and/or the PSTN 112 and/or the VoIP-enabled computer 114 and/or telephone 116 and/or VoIP-enabled telephone unit 118 and/or computer 120 and/or the telephone 122 and/or the computer 124 and/or a computer 204 are operably coupled.

Continuing to refer to FIG. 7, the following specific examples pertain to operations 700 and 702 in the context of exemplary environment 200 (illustrated in FIG. 2).

In one specific example of operation 700, and continuing the specific example of operation 300, operation 700 may include, transmitting the component information. Participant 202 may use computer 204 to transmit the component information to the recipients in the discourse through the network 110 and/or the PSTN 112, for a discourse recipient's use.

In one specific example of operation 702, and continuing the specific example of operation 302, operation 702 may include transmitting the auxiliary information. Participant 202 may use computer 204 to transmit the auxiliary information to the recipients in the discourse through the network 110 and/or the PSTN 112 for a discourse recipient's use.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (Asics), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A system related to information management, the system comprising:
   circuitry for receiving at least one text component from a discourse component;
   circuitry for matching at least a portion of the at least one text component with identifier information, including at least analyzing the at least one text component to identify location-characterizing information associated with the at least one text component;
   circuitry for retrieving at least one indication of the location-characterizing information, the at least one indication of the location-characterizing information formatted for presentation;
   circuitry for retrieving at least one indication of a name at least one of associated with or provisionally associated with a participant based at least partially on the location-characterizing information, the at least one indication of the name at least one of associated with or provisionally associated with a participant formatted for presentation; and
   circuitry for causing at least one presentation device to present at least one of the at least one text component, the location-characterizing information, or the name at least one of associated with or provisionally associated with a participant.

2. The system of claim 1, wherein circuitry for retrieving at least one indication of a name at least one of associated with or provisionally associated with a participant based at least partially on the location-characterizing information, the at least one indication of the name at least one of associated with or provisionally associated with a participant formatted for presentation comprises:
   circuitry for retrieving at least one representation of at least one name of at least one entity located or assumed to be located at a location indicated by the location-characterizing information.

3. The system of claim 1, wherein circuitry for receiving at least one text component from a discourse component comprises:
   circuitry for receiving at least one text component from a discourse component including at least one electronic mail message.

4. The system of claim 1, wherein circuitry for receiving at least one text component from a discourse component comprises:
   circuitry for receiving at least one text component from a discourse component, the discourse component received at least partially via a public switched telephone network.

5. The system of claim 1, wherein circuitry for receiving at least one text component from a discourse component comprises:
   circuitry for receiving at least one text component from a discourse component, the discourse component received at least partially via a Voice-over-Internet-Protocol system.

6. The system of claim 1, wherein circuitry for receiving at least one text component from a discourse component comprises:
   circuitry for receiving at least one text component from a discourse component, the discourse component included at least partially in a live discourse.

7. The system of claim 1, wherein circuitry for receiving at least one text component from a discourse component comprises:
   circuitry for receiving at least one text component from a discourse component, the discourse component included at least partially in a stored discourse.

8. The system of claim 1, wherein circuitry for receiving at least one text component from a discourse component comprises:
   circuitry for receiving at least one text component from a discourse component, including at least receiving at least one of voice-characterizing or word-characterizing information as the at least one text component.

9. The system of claim 1, wherein circuitry for receiving at least one text component from a discourse component comprises:
circuitry for receiving at least one text component from a discourse component, including at least receiving at least one text component associated with location-characterizing information capable of identifying a geographical location from the discourse component.

10. The system of claim 1, wherein circuitry for receiving at least one text component from a discourse component comprises:
circuitry for receiving at least one text component from a discourse component, including at least receiving face-characterizing information as the at least one text component.

11. The system of claim 1, wherein circuitry for receiving at least one text component from a discourse component comprises:
circuitry for receiving at least one text component from a discourse component, including at least receiving at least one of an IP address, a telephone number, a name, a nickname, or a role as the at least one text component.

12. The system of claim 1, wherein circuitry for retrieving at least one indication of the location-characterizing information, the at least one indication of the location-characterizing information formatted for presentation comprises:
circuitry for retrieving at least one indication of an entity at least one of associated with or provisionally associated with a participant based at least partially on the location-characterizing information, the at least one indication of the entity at least one of associated with or provisionally associated with a participant formatted for presentation.

13. The system of claim 1, wherein circuitry for retrieving at least one indication of the location-characterizing information, the at least one indication of the location-characterizing information formatted for presentation comprises:
circuitry for retrieving at least one indication of a location at least one of associated with or provisionally associated with a participant based at least partially on the location-characterizing information, the at least one indication of the location at least one of associated with or provisionally associated with a participant formatted for presentation.

14. The system of claim 1, wherein circuitry for retrieving at least one indication of the location-characterizing information, the at least one indication of the location-characterizing information formatted for presentation comprises:
circuitry for retrieving the at least one indication of the location-characterizing information from a resource associated with a participant.

15. The system of claim 1, wherein circuitry for retrieving at least one indication of the location-characterizing information, the at least one indication of the location-characterizing information formatted for presentation comprises:
circuitry for retrieving the at least one indication of the location-characterizing information from a resource associated with a third party.

16. The system of claim 1, wherein circuitry for retrieving at least one indication of the location-characterizing information, the at least one indication of the location-characterizing information formatted for presentation comprises:
circuitry for retrieving the at least one indication of the location-characterizing information from a public resource.

17. The system of claim 1, further comprising:
circuitry for storing at least one of the at least one text component, the location-characterizing information, or the name at least one of associated with or provisionally associated with a participant to populate a data template associated with a participant.

18. The system of claim 1, further comprising:
circuitry for transmitting at least one of the at least one text component, the location-characterizing information, or the name at least one of associated with or provisionally associated with a participant.

19. The system of claim 1, wherein circuitry for matching at least a portion of the at least one text component with identifier information, including at least analyzing the at least one text component to identify location-characterizing information associated with the at least one text component comprises:
circuitry for matching at least a portion of the at least one text component with identifier information, including at least analyzing the at least one text component to identify at least one street address associated with the at least one text component.

20. The system of claim 1, wherein circuitry for matching at least a portion of the at least one text component with identifier information, including at least analyzing the at least one text component to identify location-characterizing information associated with the at least one text component comprises:
circuitry for matching at least a portion of the at least one text component with identifier information, including at least analyzing the at least one text component to identify at least one name of at least one geographic location associated with the at least one text component.

21. The system of claim 1, wherein circuitry for matching at least a portion of the at least one text component with identifier information, including at least analyzing the at least one text component to identify location-characterizing information associated with the at least one text component comprises:
circuitry for matching at least a portion of the at least one text component with identifier information, including at least analyzing the at least one text component to identify at least one business name associated with the at least one text component.

22. The system of claim 1, wherein circuitry for matching at least a portion of the at least one text component with identifier information, including at least analyzing the at least one text component to identify location-characterizing information associated with the at least one text component comprises:
circuitry for matching at least a portion of the at least one text component with identifier information, including at least analyzing the at least one text component to identify at least one set of latitude and longitude associated with the at least one text component.

23. The system of claim 1, wherein circuitry for matching at least a portion of the at least one text component with identifier information, including at least analyzing the at least one text component to identify location-characterizing information associated with the at least one text component comprises:
circuitry for matching at least a portion of the at least one text component with identifier information, including at least analyzing the at least one text component to identify at least one building name associated with the at least one text component.

24. The system of claim 1, wherein circuitry for causing at least one presentation device to present at least one of the at least one text component, the location-characterizing information, or the name at least one of associated with or provisionally associated with a participant comprises:
 circuitry for causing at least one presentation device to present at least one photograph of at least one geographic location obtained in relation to the location-characterizing information.

25. The system of claim 1, wherein circuitry for causing at least one presentation device to present at least one of the at least one text component, the location-characterizing information, or the name at least one of associated with or provisionally associated with a participant comprises:
 circuitry for causing at least one presentation device to present at least one indication of at least one street map obtained in relation to the location-characterizing information.

26. The system of claim 1, wherein circuitry for causing at least one presentation device to present at least one of the at least one text component, the location-characterizing information, or the name at least one of associated with or provisionally associated with a participant comprises:
 circuitry for causing at least one presentation device to present at least one indication of at least one set of textual directions to at least one geographic location associated with the location-characterizing information.

27. The system of claim 1, wherein circuitry for matching at least a portion of the at least one text component with identifier information, including at least analyzing the at least one text component to identify location-characterizing information associated with the at least one text component comprises:
 circuitry for determining that the at least one text component includes at least some directions for traveling from a start point to a destination.

28. The system of claim 1, wherein circuitry for matching at least a portion of the at least one text component with identifier information, including at least analyzing the at least one text component to identify location-characterizing information associated with the at least one text component comprises:
 circuitry for determining that the at least one text component includes at least some words that pertain to locations, including at least one numeral adjacent to at least one word designating at least one street within the at least one text component.

29. A system related to information management, the system comprising:
 circuitry for receiving at least one text component from a discourse component, including at least receiving, by a first computing device associated with a first participant, the at least one text component from an instant message sent from a computing device associated with a second participant;
 circuitry for matching at least a portion of the at least one text component with identifier information, including at least analyzing the at least one text component to identify location-characterizing information associated with the at least one text component;
 circuitry for retrieving at least one indication of the location-characterizing information, the at least one indication of the location-characterizing information formatted for presentation to the first participant as at least a portion of a first user interface selection associated with performing one or more additional operations related to the location-characterizing information;
 circuitry for causing at least one presentation device, including at least one display of the first computing device associated with the first participant, to present at least one of the at least one text component or the location-characterizing information;
 circuitry for retrieving, responsive to activation of the first user interface selection associated with performing one or more additional operations related to the location-characterizing information, at least one indication of a name at least one of associated with or provisionally associated with a participant including at least one or more names of one or more applications capable of receiving the location-characterizing information and installed on the first computing device associated with the first participant based at least partially on the location-characterizing information, the at least one indication of the name at least one of associated with or provisionally associated with a participant formatted for presentation to the first participant as at least a portion of a second user interface selection associated with launching the one or more applications capable of receiving the location-characterizing information and installed on the first computing device associated with the first participant; and
 circuitry for causing the at least one presentation device, including at least one display of the first computing device associated with the first participant, to present at least one of the at least one text component, the location-characterizing information, or the name at least one of associated with or provisionally associated with a participant.

30. A system related to information management, the system comprising:
 circuitry for receiving at least one text component information from a discourse component, including at least:
 circuitry for receiving at least one message body from at least one email message;
 circuitry for matching at least a portion of the at least one text component with identifier information, including at least analyzing the at least one text component to identify location-characterizing information associated with the at least one text component, including at least:
 circuitry for determining whether the at least one message body includes at least one reference to at least one street address;
 circuitry for retrieving at least one indication of the location-characterizing information, the at least one indication of the location-characterizing information formatted for presentation, including at least:
 circuitry for obtaining at least one map of at least one area associated with the at least one street address;
 circuitry for retrieving at least one indication of a name at least one of associated with or provisionally associated with a participant based at least partially on the location-characterizing information, the at least one indication of the name at least one of associated with or provisionally associated with a participant formatted for presentation, including at least:
 circuitry for obtaining at least one text-based representation of at least one name, the at least one name associated with at least one of a sender of the at least one email message or at least one entity assumed to be located at the at least one street address; and
 circuitry for causing at least one presentation device to present at least one of the at least one text component, the location-characterizing information, or the name at least one of associated with or provisionally associated with a participant, including at least:

circuitry for causing at least one email application to display, within a representation of the at least one message body of the at least one email message, the at least one map of at least one area associated with the at least one street address and the at least one text-based representation of at least one name.

* * * * *